US012626698B1

(12) United States Patent
Kachuee et al.

(10) Patent No.: US 12,626,698 B1
(45) Date of Patent: May 12, 2026

(54) COMPONENT SHORTLISTING

(71) Applicant: Amazon Technologies, Inc., Seattle, WA (US)

(72) Inventors: Mohammad Kachuee, Bellevue, WA (US); Vaibhav Kumar, Redmond, WA (US); Yibo Yao, Bellevue, WA (US); Saurabh Gupta, Seattle, WA (US); Xiang Li, Bellevue, WA (US); Puyang Xu, Issaquah, WA (US); Xing Fan, Redmond, WA (US); Corey Daniel Rogers, Bothell, WA (US); Prakhar Bhardwaj, Valley Village, CA (US)

(73) Assignee: Amazon Technologies, Inc., Seattle, WA (US)

( * ) Notice: Subject to any disclaimer, the term of this patent is extended or adjusted under 35 U.S.C. 154(b) by 237 days.

(21) Appl. No.: 18/470,003

(22) Filed: Sep. 19, 2023

(51) Int. Cl.
| | |
|---|---|
| *G10L 15/22* | (2006.01) |
| *G06F 16/3329* | (2025.01) |
| *G06F 16/335* | (2019.01) |
| *G10L 15/26* | (2006.01) |

(52) U.S. Cl.
CPC .......... *G10L 15/22* (2013.01); *G06F 16/3329* (2019.01); *G06F 16/335* (2019.01); *G10L 15/26* (2013.01); *G10L 2015/223* (2013.01)

(58) Field of Classification Search
CPC . G10L 2015/223; G10L 15/16; G10L 15/063; G10L 15/22; G10L 15/30; G10L 15/26; G10L 2015/228; G10L 17/00; G10L 15/07; G06N 5/022; G06N 20/00
USPC ....................................................... 704/275
See application file for complete search history.

(56) References Cited

U.S. PATENT DOCUMENTS

| | | | | |
|---|---|---|---|---|
| 11,042,554 B1* | 6/2021 | Balakrishnan | ......... | G06Q 50/01 |
| 11,748,555 B2* | 9/2023 | Tran | ....................... | G06N 3/047 |
| | | | | 715/202 |
| 12,229,172 B2* | 2/2025 | Chaturvedi | ......... | G06F 16/3323 |
| 2021/0118440 A1* | 4/2021 | Peng | ......................... | G06F 9/54 |
| 2023/0135179 A1* | 5/2023 | Mielke | .................. | G06N 5/022 |
| | | | | 704/232 |
| 2023/0245651 A1* | 8/2023 | Wang | ..................... | G06N 5/022 |
| | | | | 704/275 |
| 2024/0249318 A1* | 7/2024 | Spiegel | ................... | H04L 51/02 |
| 2024/0267344 A1* | 8/2024 | Mulligan | .............. | H04L 51/214 |
| 2024/0353981 A1* | 10/2024 | Horton | ................. | H04L 67/306 |

(Continued)

OTHER PUBLICATIONS

Su, Hongjin, et al. "One Embedder, Any Task: Instruction-Finetuned Text Embeddings." arXiv preprint arXiv:2212.09741v3 (2023).

(Continued)

*Primary Examiner* — Vijay B Chawan
(74) *Attorney, Agent, or Firm* — Pierce Atwood LLP

(57) ABSTRACT

Techniques for identifying components (e.g., application program interfaces (APIs)) relevant for a large language model (LLM) prompt are described. The shortlister includes one or more proposers that each select n components for performing an instant task. The n components from each proposer may be merged and reranked to produce a ranked list of K components for inclusion in the LLM prompt. The shortlister proposers can include, among others, a request-based proposer, query-based proposer, and/or rule-based proposer. In particular, the query-based proposer may utilize a LLM to generate a query to search component descriptions to identify n components the proposer determines are usable to perform the instant task.

20 Claims, 14 Drawing Sheets

(56) References Cited

U.S. PATENT DOCUMENTS

| | | | | |
|---|---|---|---|---|
| 2024/0354641 | A1* | 10/2024 | Miller | G06N 3/045 |
| 2024/0355065 | A1* | 10/2024 | Miller | G06T 19/006 |
| 2024/0356871 | A1* | 10/2024 | Brewer | H04L 51/04 |
| 2024/0403772 | A1* | 12/2024 | Lafreniere | G06F 3/011 |
| 2024/0406477 | A1* | 12/2024 | Dela Rosa | G06N 3/0895 |
| 2025/0005049 | A1* | 1/2025 | Chaturvedi | G06F 16/3323 |
| 2025/0005385 | A1* | 1/2025 | Chaturvedi | G06F 40/30 |
| 2025/0053735 | A1* | 2/2025 | Shevchenko | G06F 40/30 |
| 2025/0061491 | A1* | 2/2025 | Ahmad-Taylor | G06Q 30/0271 |
| 2025/0077794 | A1* | 3/2025 | Mikhailiuk | G06F 3/04845 |
| 2025/0094511 | A1* | 3/2025 | Badr | G06F 16/9535 |

OTHER PUBLICATIONS

Wang, Liang, et al. "Text Embeddings by Weakly-Supervised Contrastive Pre-Training." arXiv preprint arXiv:2212.03533v1 (2022).
Ni, Jianmo, et al. "Sentence-T5: Scalable Sentence Encoders from Pre-trained Text-to-Text Models." arXiv preprint arXiv:2108.08877v3 (2021).
Kachuee, Mohammad, et al. "Scalable and Robust Self-Learning for Skill Routing in Large-Scale Conversational AI Systems." arXiv preprint arXiv:2204.07135v1 (2022).
Swaminathan, Adith, et al. "Off-policy evaluation for slate recommendation." 31st Conference on Neural Information Processing Systems (2017).
Zhou, Chunting, et al. LIMA: Less Is More for Alignment. arXiv preprint arXiv:2305.11206v1 (2023).
Touvron, Hugo, et al. "Llama 2: Open Foundation and Fine-Tuned Chat Models." arXiv preprint arXiv:2307.09288v2 (2023).

* cited by examiner

FIG. 1B

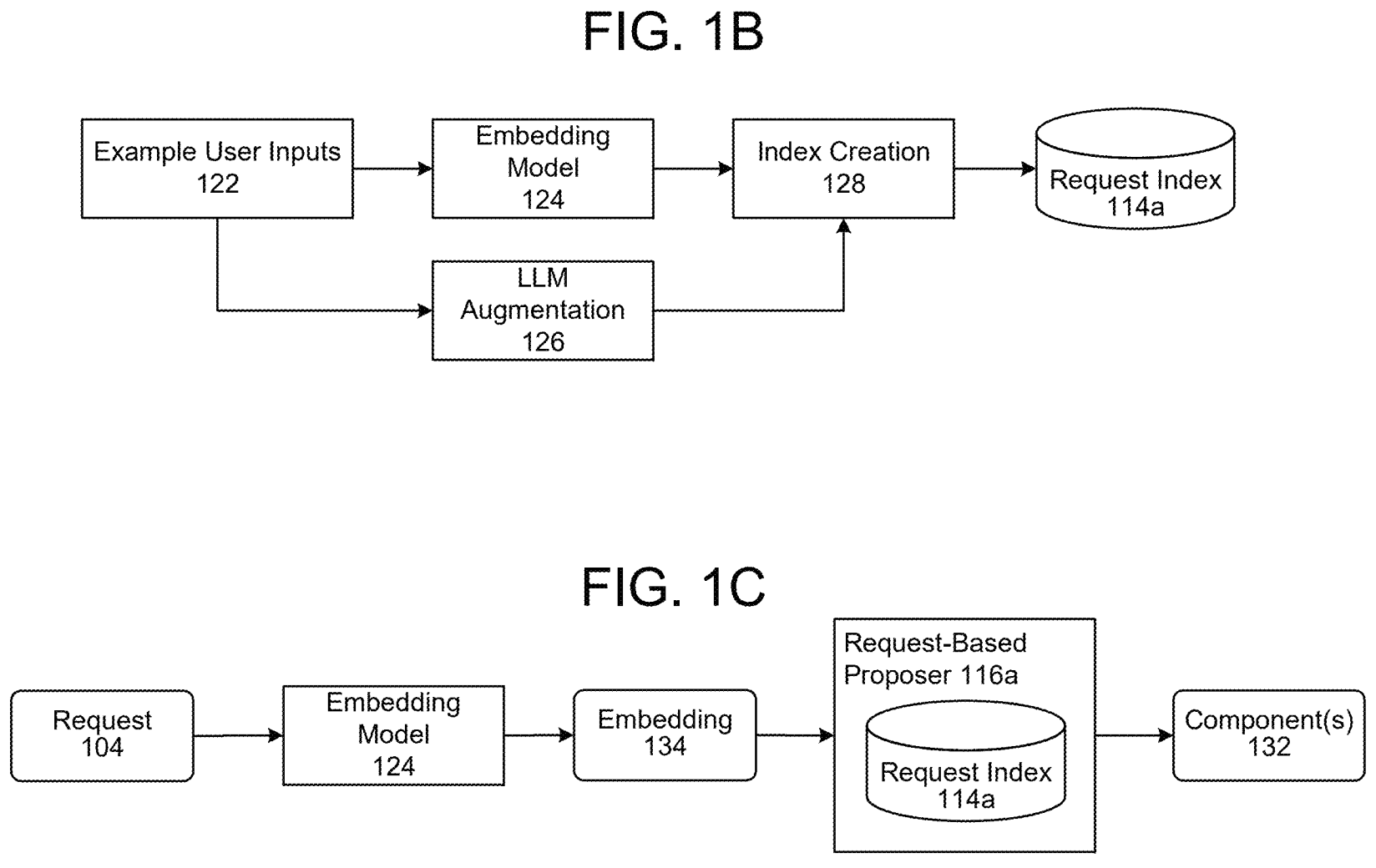

Example User Inputs 122 → Embedding Model 124 → Index Creation 128 → Request Index 114a Example User Inputs 122 → LLM Augmentation 126 → Index Creation 128

FIG. 1C

Request 104 → Embedding Model 124 → Embedding 134 → Request-Based Proposer 116a (Request Index 114a) → Component(s) 132

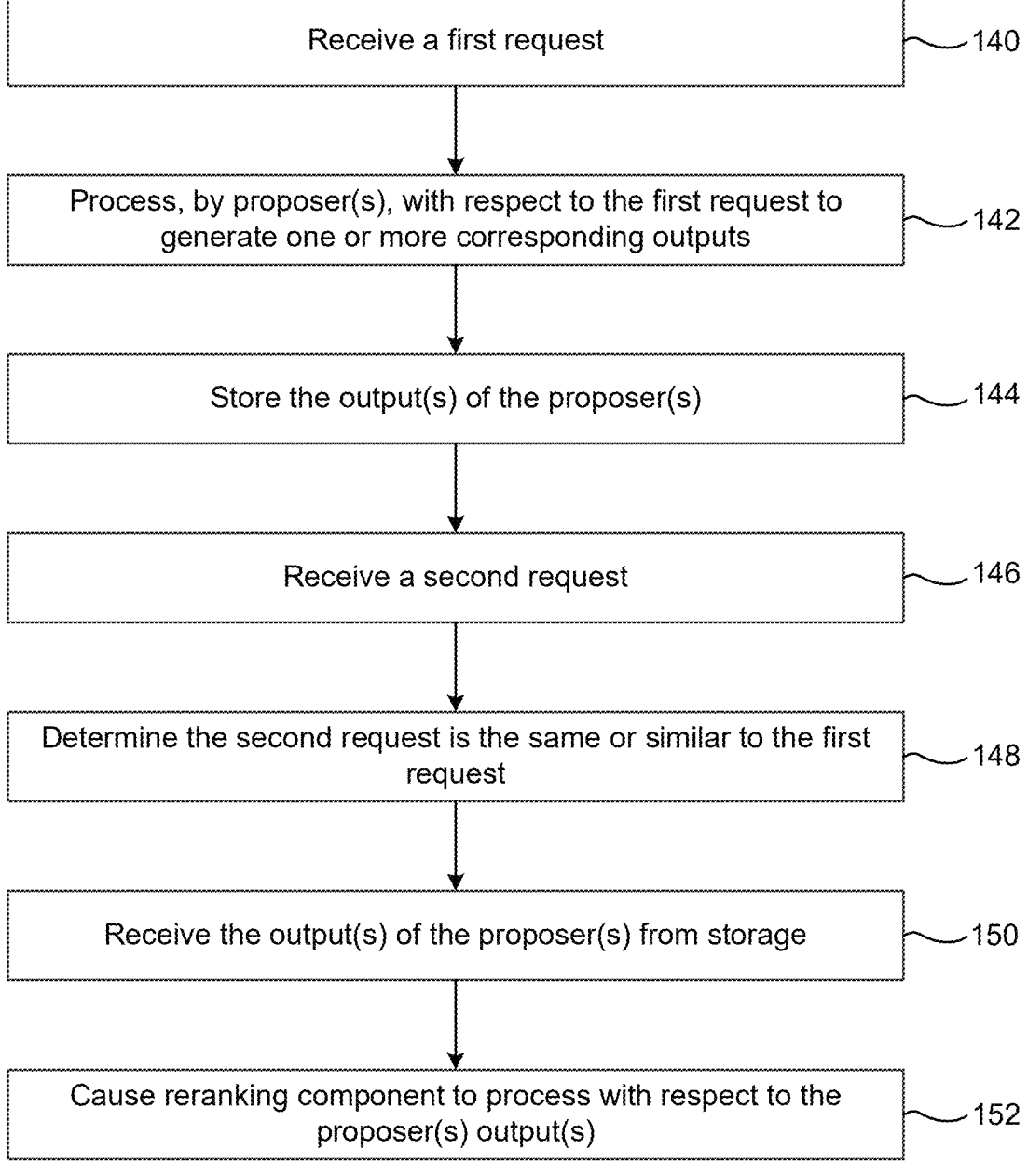

Receive a first request ⟋140

Process, by proposer(s), with respect to the first request to generate one or more corresponding outputs ⟋142

Store the output(s) of the proposer(s) ⟋144

Receive a second request ⟋146

Determine the second request is the same or similar to the first request ⟋148

Receive the output(s) of the proposer(s) from storage ⟋150

Cause reranking component to process with respect to the proposer(s) output(s) ⟋152

Figure 9:
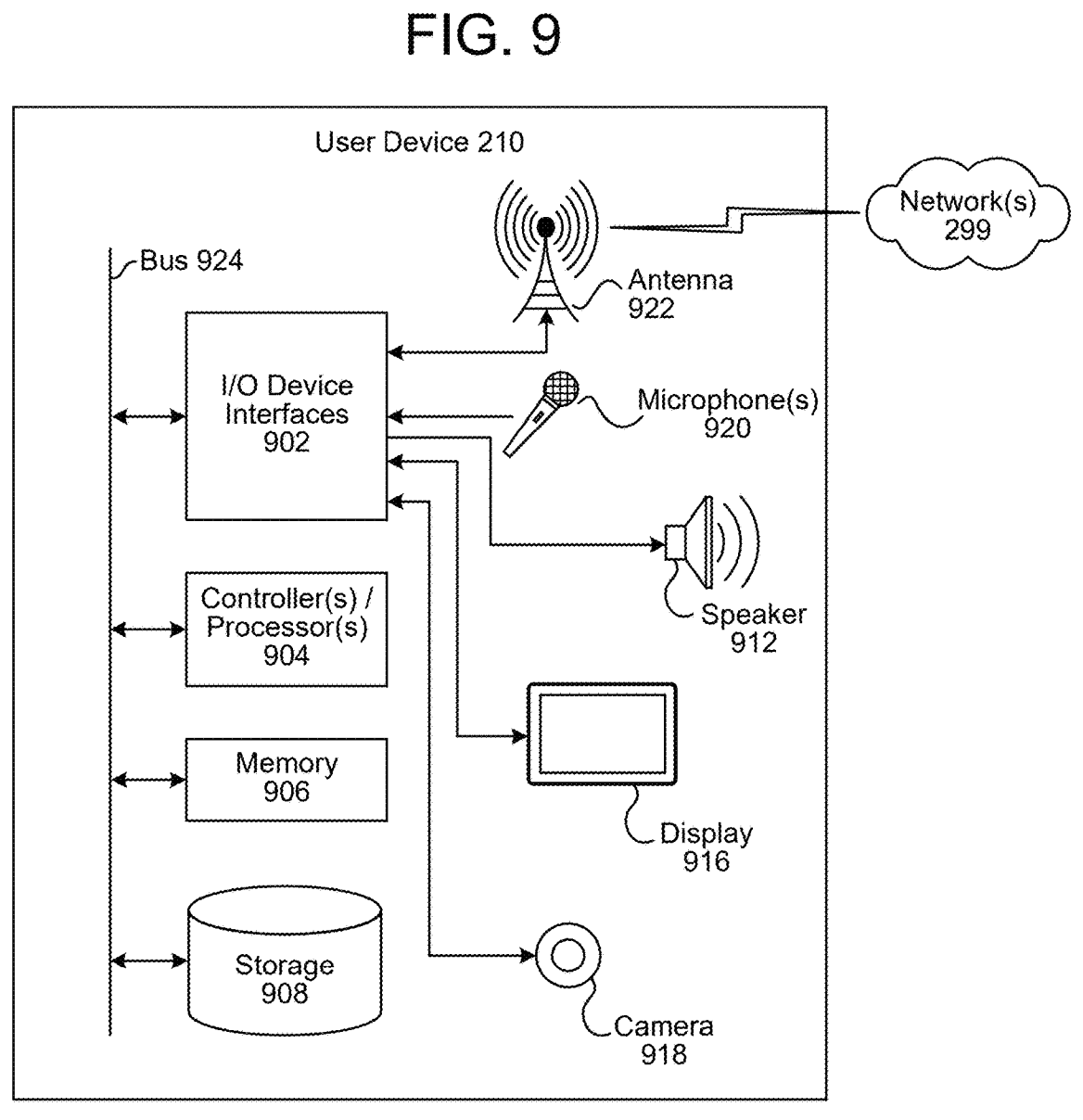

User Device 210

Network(s) 299

Antenna 922

Microphone(s) 920

Speaker 912

Display 916

Camera 918

Bus 924

I/O Device Interfaces 902

Controller(s) / Processor(s) 904

Memory 906

Storage 908

FIG. 10

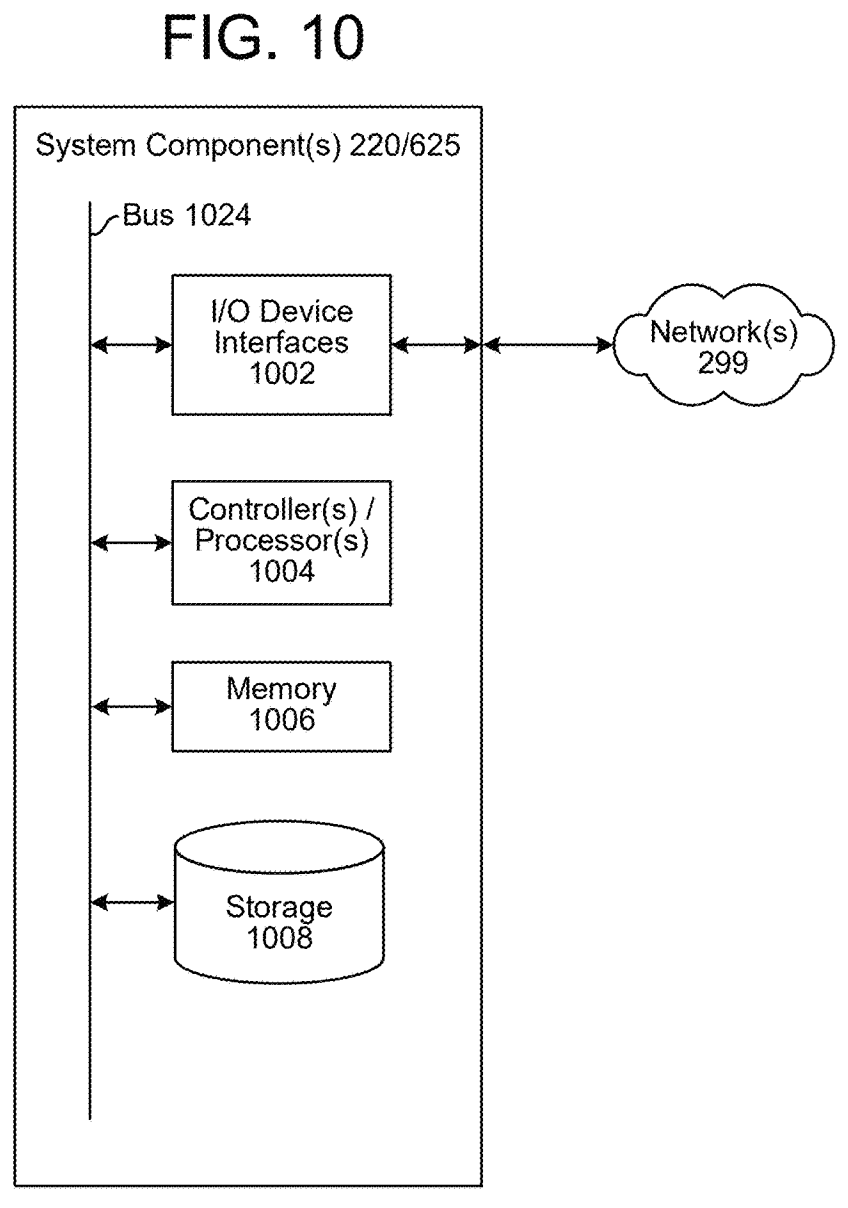

Network(s) 299

System Component(s) 220/625

Bus 1024

I/O Device Interfaces 1002

Controller(s) / Processor(s) 1004

Memory 1006

Storage 1008

COMPONENT SHORTLISTING

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Such processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1B is a conceptual diagram illustrating creation of a request index, according to embodiments of the present disclosure.

FIG. 1C is a conceptual diagram illustrating a runtime embedding based search process, according to embodiments of the present disclosure.

FIG. 1D is a conceptual diagram illustrating asynchronous calling of component proposers of the component shortlister, according to embodiments of the present disclosure.

FIG. 1E is a conceptual diagram illustrating a process for caching outputs of component proposers for use with respect to a subsequent request(s), according to embodiments of the present disclosure.

FIG. 7 is a conceptual diagram illustrating example processing of an arbitrator component, according to embodiments of the present disclosure.

FIG. 9 is a block diagram conceptually illustrating example components of a user device, according to embodiments of the present disclosure.

FIG. 10 is a block diagram conceptually illustrating example components of a system component, according to embodiments of the present disclosure.

DETAILED DESCRIPTION

Figure 1A:
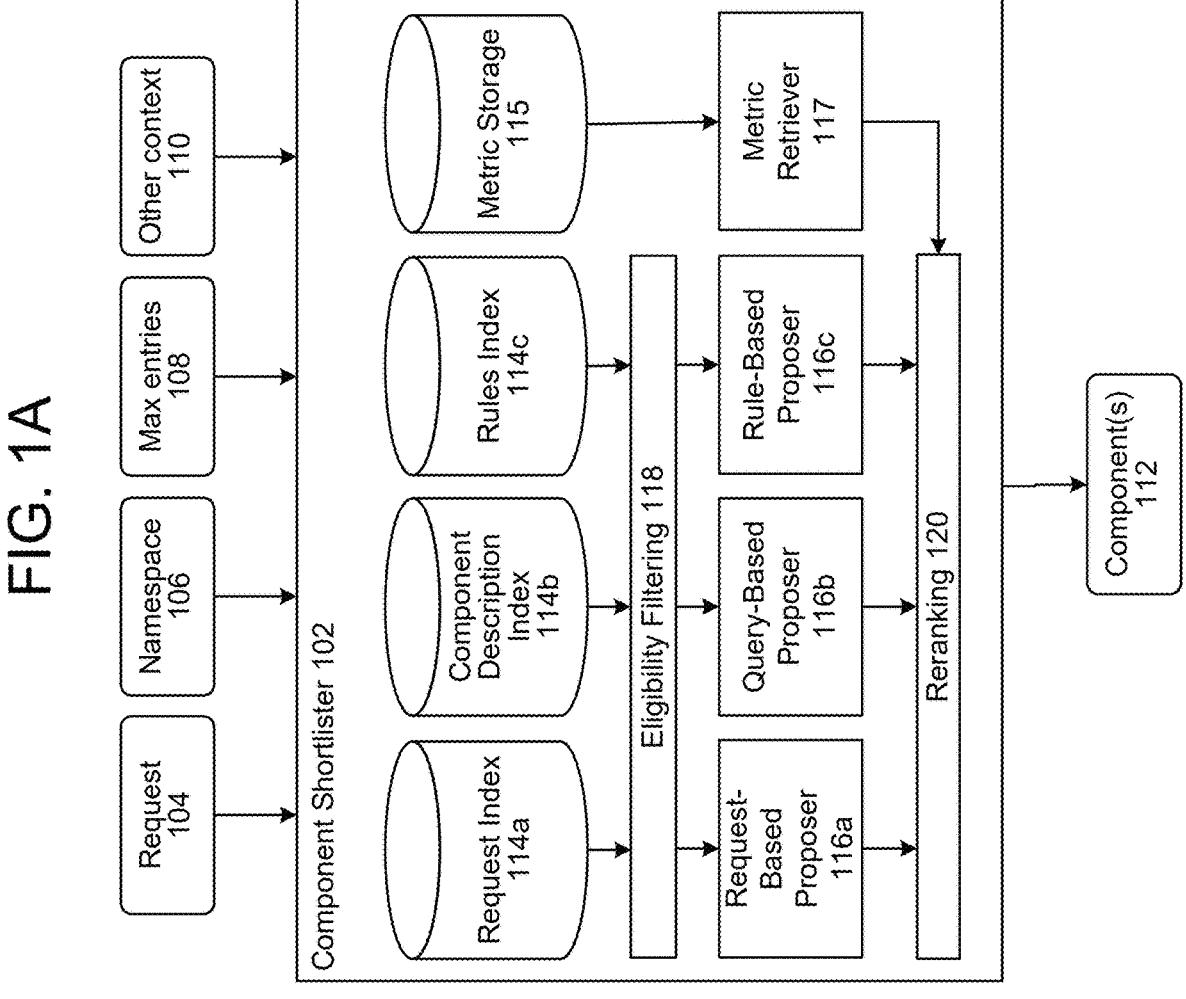
FIG. 1A is a conceptual diagram illustrating a component shortlister, according to embodiments of the present disclosure.

In-context learning enables large language models (LLMs) access to knowledge outside the training data. As used herein, "LLM" refers to an artificial intelligence model trained on a vast amount of text to understand existing context and generate original content. For example, a LLM may be a transformer-based seq2seq model involving an encoder-decoder architecture. In an encoder-decoder architecture, the encoder may produce a representation of an input text using a bidirectional encoding, and the decoder may use that representation to perform some task. For further example, a LLM may be a decoder-only architecture. The decoder-only architecture may use left-to-right (i.e., unidirectional) encoding of the input text. Example LLMs of the present disclosure include, but are not limited to, the Alexa Teacher Model, Generative Pre-trained Transformer (GPT) models (such as GPT-3), BigScience Large Open-science Open-access Multilingual Language Model (BLOOM), Language Model for Dialogue Applications model (LaMDA), Bard, Large Language Model Meta AI (LLaMA), Titan Foundational Model, Bidirectional Auto-Regressive Transformers (BART), and T5.

The input to the LLM may be in the form of a prompt. A prompt may be a natural language input, for example, an instruction, for the LLM to generate an output according to the prompt. The output generated by the LLM may be a natural language output responsive to the prompt. In some embodiments, the output may be another type of data, such as audio, image, video, etc. The prompt, in some cases, can also include in-context learning information that may be used by the LLM to generate a response to the prompt.

With in-context learning, the LLM can be directly instructed to use a set of candidate components (e.g., application program interfaces, or APIs), but it is limited by the length of context and the compute/latency overhead of processing long prompts. Simply indicating all available components within the prompt is infeasible as the length of the prompt will increase linearly with the number of components and the memory/compute/latency costs of transformer architectures will increase linearly (quadratically in many cases) as well.

The present disclosure provides, among other things, a component shortlister that helps reduce the amount of information (e.g., the available components included as in-context learning data) included in a prompt for a LLM. The component shortlister reduces the context information provided for component selection by an LLM, can facilitate cold-start (i.e., new user experiences and features being introduced in the system) and few-shot (i.e., developers only sharing a few examples of component usage) onboarding of new components for an improved developer experience, and increases robustness towards rapidly changing component specifications and policies. The component shortlister can help reduce the burden on the developer to provide (or enumerate) a large list of cases where a particular component should be selected to reach high-recall decisions. At the same time, the component shortlister may generalize beyond user input patterns and leverage higher level contextual understanding captured by LLMs while also adding minimal latency in the user input response generation pipeline. In some embodiments, the component shortlister is configured to bias toward fast high-recall processing and other late-binding components may be configured to deal with high-precision decision making.

One or more of the system components described herein may call/execute the component shortlister. That is, the system component(s) may send, to the component shortlister, a request for a list of components that are available or relevant for the system components' processing. In example embodiments, the component shortlister may take as input certain data such as a query generated by a LLM, a namespace to focus shortlisting to components within the namespace, and/or a max entries parameter to control the number of components the component shortlister outputs.

Embodiments of the component shorlister include one or more proposers configured to determine n-best components for processing of a present task. For example, the component shortlister may include a request-based proposer, a query-based proposer, and/or a rule-based proposer. The request-based proposer may identify components usable for a present task based on sample user inputs for invoking certain components. The query-based proposer may identify components usable for a present task based on component descriptions. The Rule-based proposer may identify components usable for a present task based on one or more rules. Prior to processing by the proposer(s), the available components (which may be a relatively high number of components) may be filtered based on certain factors, such as device type, device location, etc.

The component shortlister may merge the components identified by each proposer, and rerank the components to generate a list of ranked components, where each component in the list may be associated with a corresponding confidence score and/or metadata about shortlisting that can be useful for downstream processing (e.g., indicating a component was identified due to an exact match between the component's sample user input(s); indicating that a component was identified speculatively based on affinity, etc.).

In some embodiments, the component shortlister may not be responsible for LLM prompt generation. During prompt generation, additional logic can be used to generate the representation of shortlisted components and metadata that is useful for the LLM. Rather, the component shortlister of the present disclosure may be implemented as a service for various system components that need context for LLM prompt generation. The component shortlister can also be used in situations other than LLM prompt generation, for example, for determining a shorter/smaller list of components available to process a task. As used herein, a component available to process a task may include an API, a LLM-based agent, a skill component, etc.

Teachings of the present disclosure provide, among other things, an improved user experience by reducing user-perceived latency and increasing accuracy due to the component shortlister limiting the components, indicated in the LLM prompt, to those most likely to be relevant to perform the instant task. By limiting the components provided to an LLM (or another component) to the ones that are most relevant, the LLM (or other component) may more accurately select the correct/final component to perform the task.

A first aspect of the present disclosure relates to a method including (and corresponding system configured to) receiving audio data corresponding to a first spoken user input associated with user profile data; processing the audio data to determine a transcript of the first spoken user input; generating a first prompt for a first search query to identify one or more application program interfaces (APIs) based on the transcript and the user profile data; processing, using a first large language model (LLM), the first prompt to determine the first search query; using a first machine learning (ML) trained model, processing the first search query and a plurality of API descriptions to determine a set of APIs capable of performing a task with respect to the first spoken user input; generating a second prompt to identify at least one API, from the set of APIs, to perform the task, the second prompt including the user profile data; processing, using a second LLM, the second prompt to select, from the set of APIs, a first API to perform the task; based on the second LLM selecting the first API, performing, using the first API, the task to determine output data responsive to the first spoken user input; and causing presentation of the output data.

In some embodiments of the first aspect, method includes (and corresponding system is configured to) receiving metric data associated with the first API, wherein the metric data indicates at least one of: a number of times the first API was called and provided a response; a number of times the first API was called and resulted in positive user feedback; and a number of times the first API was called with respect to user inputs associated with the user profile data; and based at least in part on the metric data, including the first API in the set of APIs.

In some embodiments of the first aspect, method includes (and corresponding system is configured to) determining a first location indicated in the user profile data; determining a second location associated with a second API; determining the second location is different from the first location; and excluding, from the plurality of API descriptions, an API description of the second API based on the second location being different from the first location.

In some embodiments of the first aspect, method includes (and corresponding system is configured to) using a second ML trained model, processing the transcript and a stored second spoken user input for invoking a second API to determine the second API is configured to perform the task; and generating the second prompt to further indicate the second API.

A second aspect of the present disclosure relates to a method including (and corresponding system configured to) receiving first input data representing a first user input; determining, using the first input data, a first query to search component descriptions to identify one or more components corresponding to the first user input; using the first query, determining a set of components corresponding to the first user input; generating a first prompt to identify, from the set of components, at least one component to perform a task corresponding to the first user input; processing, using a first large language model (LLM), the first prompt to select from the set of components, a first component to perform the task; generating, using at least the first component, output data responsive to the first user input; and presenting the output data.

In some embodiments of the second aspect, method includes (and corresponding system is configured to) receiving metric data associated with the first component, wherein the metric data indicates at least one of: a number of times the first component was called and provided a response; a number of times the first component was called and resulted in positive user feedback; and a number of times the first component was called with respect to user inputs associated with user profile data associated with the first user input; and based at least in part on the metric data, generating the first prompt to indicate the first component.

In some embodiments of the second aspect, method includes (and corresponding system is configured to) determining a first location indicated in user profile data associated with the first user input; determining a second location associated with a second component; determining the second location is different from the first location; and based on the second location being different from the first location, excluding the second component from the set of components.

In some embodiments of the second aspect, method includes (and corresponding system is configured to) based on a stored second user input for invoking a second component, determining the second component is configured to perform the task; and generating the first prompt to further indicate the second component.

In some embodiments of the second aspect, method includes (and corresponding system is configured to) receiving audio data corresponding to the first user input; performing automatic speech recognition (ASR) processing on the audio data to generate ASR results; determining the second component is configured to perform the task based on the stored second user input corresponding to the ASR results; and determining the set of components using the first query at least partially in parallel or after determining the second component is configured to perform the task.

In some embodiments of the second aspect, method includes (and corresponding system is configured to) generating a second prompt for the first query; and processing, using a second LLM, the second prompt to determine the first query.

In some embodiments of the second aspect, the first user input is received from a first device, and method includes (and corresponding system is configured to) determining a first device type of the first device; determining a second device type associated with a second component; determining the second device type is different from the first device type; and excluding the second component from the first prompt based on the second device type being different from the first device type.

In some embodiments of the second aspect, method includes (and corresponding system is configured to) storing first data indicating the first component was selected to perform the task with respect to the first user input; receiving second data representing a second user input; determining the second user input corresponds to the first user input; and based on the second user input corresponding to the first user input, determining the first component is configured to perform a task with respect to the second user input.

A system according to the present disclosure will ordinarily be configured to incorporate user permissions and only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1A illustrates the component shortlister 102, according to various embodiments of the present disclosure. As shown in FIG. 1A, the component shortlister 102 takes as input a request 104 that may be a request to perform a task. In some cases, the request 104 may be a request that is to be provided to a LLM for processing. The component shortlister 102 may also optionally take as input a namespace 106, to focus shortlisting to components within the namespace, and/or max entries 108 to control the number of components 112 the component shortlister 102 outputs. As used herein, a "namespace" refers to a grouping of components based on topic/subject matter. Example namespaces includes, but are not limited to, music, smart home, weather, food ordering, ride sharing, travel, and video.

The component shortlister 102 may also take as input any other context 110 available at the time the request 104 is being input to the component shortlister 102 and which may be used by the component shortlister 102 to identify one or more components 112 as described herein below. For example, the other context 110 may include user profile data indicating a location associated with the instant user and/or one or more components identified as user preferred components for processing with respect to inputs of the user. For further example, the other context 110 may include device profile data indicating a device type of the user device that captured the instant user input and/or one or more capabilities (e.g., output capabilities) of the user device. In some embodiments, the other context 110 may be determined by a personalized context component 265 as described below.

The component shortlister 102 may include one or more indexes 114 corresponding to one or more proposers 116. For example, the component shortlister 102 may include a request index 114a corresponding to a request-based proposer 116a, a component description index 114b corresponding to a query-based proposer 116b, and a rules index 114c corresponding to a rule-based proposer 116c. However, it is noted the number and kinds of indexes 114 and proposers 116 are configurable and not limited to that illustrated in FIG. 1A and described herein.

The request index 114a includes component identifiers each associated with one or more user inputs usable to invoke the corresponding component. In this context, a "component" refers to an application program interface (API), skill component, or some other LLM agent that is capable of performing processing with respect to a task, where the LLM may identify/select such component to perform the task. After the LLM identifies/selects the component, another system component (e.g., an action plan execution component 245) may call or otherwise cause the identified component to execute/process. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. A skill component may be configured to perform processing with respect to a domain, such as weather, car service booking, trip booking, food order booking, music, smart home, etc.

The request index 114a may store a user input in a natural language format, such as "what is the weather," "book me a trip to [location]," "order [user's favorite food] from [restaurant name]," "turn on [light name]," etc. Additionally or alternatively, the request index 114a may store a user input in a structured format indicating one or more entity types and corresponding entities included in the user input. For example, for the user input "book me a trip to [location]," the request index 114a may store data indicating the user input includes a "location" entity type and optionally an entity value of "[location]." For further example, for the user input "order [user's favorite food] from [restaurant name]," the request index 114a may store data indicating the user input includes "food" and "location" entity types and optionally the entity values of "[user's favorite food]" and "[restaurant name]." As another example, for the user input "turn on [light name]," the request index 114a may store data indicating the user input includes a "device name" entity type and optionally an entity value of "[light name]." The user inputs included in the request index 114a may be provided by component developers, derived from live system inputs, and/or from one or more other sources.

The component description index 114b includes component identifiers each associated with corresponding component descriptions. In this context, a "component" refers to an application program interface (API), skill component, or some other LLM agent that is capable of being called by a LLM to perform processing with respect to a task the LLM is performing. For example, a component's description may include a component name, a namespace to which the component corresponds, a listing of the function(s) performable by the component (e.g., an API's description may include a list of arguments with corresponding argument names, descriptions, types, valid values, default values, and indications of what data is required versus optional), the types of data needed by the component to perform the function(s), and/or one or more example user inputs for invoking the component, etc.

The rules index 114c includes one or more deterministic rules indicating when a component is configured to perform a task. For example, a rule may indicate a component is configured to perform a task when the user device (that received the user input) includes a display, when the user device does not include a display, then the user or user device is associated with a location (e.g., geographic location, specific global positioning system (GPS) coordinates, etc.), when the user device corresponds to one or more particular device types, and/or when it is determined that a system response to a previous user input of a present dialog was incorrect. For example, a rule may indicate that, for a device located in a hotel room, a "call staff for help" component is to be proposed, deterministically.

The component shortlister 102 may also include a metric storage 115. The metric storage 115 includes component-specific metrics. For example, the metric storage 115 may include, for a particular component, a number of times (e.g., during a time period) the component was called and provided a response, a number of times (e.g., during a time period) the component was called and the system's response to a user input resulted in positive user feedback; and/or a number of times (or frequency) the component was called with respect to user inputs from a particular user (e.g., user inputs associated with specific user profile data).

Not all components may be eligible to serve a user request for a given user and/or context. For example, subscription-based components may be limited to processing user inputs of users who have subscribed to the components. For further example, access to components can be limited based on device types (e.g., components for car control are only relevant for requests from automotive devices, components may only be relevant for devices with screens, etc.) and/or device/user locations.

The component shortlister 102 may include an eligibility filtering component 118 configured to determine which components can be considered as a candidate component for processing with respect to the user request. The eligibility filtering component 118 is able to filter out ineligible components (e.g., components that cannot process with respect to the user request) without causing any late binding opportunity costs, as the eligibility filtering component 118 may be configured to only remove components with absolute zero likelihood of being relevant/eligible. Such filtering may help reduce the search space of components for the proposer(s) 116.

Upon the component shortlister 102 receiving the request 104 and optionally the namespace 106, the max entries 108, and/or the other context 110, the eligibility filtering component 118 may receive data from the request index 114a, the component description index 114b, and the rules index 114c, perform eligibility filtering processing with respect to same, and send post-filtered data to the respective proposers 116. For example, the eligibility filtering component 118 may receive component identifiers and corresponding sample user inputs from the request index 114a, filter out one or more of the component identifiers and corresponding sample user input(s), and send the remaining component identifier(s) and corresponding sample user input(s) to the request-based proposer 116a. For further example, the eligibility filtering component 118 may receive component identifiers and corresponding component descriptions from the component description index 114b, filter out one or more of the component identifiers and corresponding component description(s), and send the remaining component identifier(s) and corresponding component description(s) to the query-based proposer 116b. As another example, the eligibility filtering component 118 may receive component identifiers and corresponding rules from the rules index 114c, filter out one or more of the components and corresponding rules, and send the remaining components and corresponding rules to the rule-based proposer 116c.

The eligibility filtering component 118 may filter out components based on one or more criteria. For example, the other context 110 may include user profile data indicating whether the user has subscribed to having one or more subscription-based components process with respect to the user inputs, and the eligibility filtering component 118 may remove, from the data received from an index 114, data corresponding to subscription-based components to which the user does not have a subscription. For further example, the other context 110 may include user profile data indicating a (geographic) location associated the user, and the eligibility filtering component 118 may remove, from the data received from an index 114, data corresponding to components corresponding to different (geographic) locations. As another example, the other context 110 may include device profile data indicating a (geographic) location associated the user device that captured the instant user input, and the eligibility filtering component 118 may remove, from the data received from an index 114, data corresponding to components corresponding to different (geographic) locations. For further example, the other context 110 may include device profile data indicating a device type of the user device that captured the instant user input, and the eligibility filtering component 118 may remove, from the data received from an index 114, data corresponding to components corresponding to different device types. As another example, the other context 110 may include device profile data indicating one or more output capabilities (e.g., display capability, audio output capability, etc.) associated the user device that captured the instant user input, and the eligibility filtering component 118 may remove, from the data received from an index 114, data corresponding to components that provide output data not capable of being output using the one or more output capabilities.

The eligibility filtering component 118 may be implemented as a rule-based component. Alternatively, the eligibility filtering component 118 may be implemented as a machine learning (ML)-based component. If implemented as a ML-based, the eligibility filtering component 118 may be configured to only remove data of components the ML model is 100% confident should be filtered out.

The eligibility filtering component 118 may be implemented prior to the processing of the proposer(s) 116 or after the proposer(s) 116 output candidate components. Where the eligibility filtering component 118 is implemented is a system configuration decision as the former approach could impact the latency whereas the latter could impact recall.

The eligibility filtering component 118 may be implemented within the system component that receives the output of the component shortlister 102. However, it would be beneficial for cases that can be deterministically accounted for to be taken care of within the component shortlister 102. An early binding strategy instead of a late binding strategy to filter out candidates may help with the following:

Reduction in the number of reasoning steps required for successfully serving a user request: If the top-K relevant candidates returned by the component shortlister 102 are all ineligible candidates, then a late binding strategy may necessitate that the component shortlister 102 be called multiple times until a good list of eligible and relevant candidates are found. This may unnecessarily increase the complexity of the component shortlisting task.

Helps in boosting the per turn component recall: The reduction in the number of reasoning steps may in-turn help with boosting the overall recall.

As a side-effect, may help in reducing the context-length for the LLM prompt.

The system may implement one or more approaches for eligibility filtering. In index-level filtering, given eligibility criteria, the components that do not meet the eligibility criteria can be flagged during retrieval. This means that when the individual proposers 116 query their corresponding indexes 114, the components that are not eligible would not be searchable within the index. For example, suppose there are 1000 components represented in the request index 114a of the request-based proposer 116a and eligibility criteria deems 50 components ranging from component1 to component50 cannot be an eligible candidate. This information is sent to the request index 114a, and the request index 114a flags the components (i.e., component1 to component50) making them ineligible for retrieval. Thus, the pool of candidates within the request index 114a is filtered down and the search space is reduced. Benefits of index-level filtering include: (i) reducing the search space at the index level boosting recall; and (ii) reduction of the number of retrieval steps and hence potential latency benefits. For example, suppose the filtering is not done at the index level, each proposer returns top-K candidates and the filtering is performed post-retrieval, and the eligibility filtering component 118 deems all the components in top-K are ineligible. To circumvent this issue, another retrieval step may be performed to identify more candidates, thereby increasing the total number of retrieval steps.

The eligibility filtering component 118 may alternatively be implemented post processing of the proposers 116a through 116c. In this configuration, ineligible component candidates can be filtered out after the proposals have been made by the individual proposers 116a through 116c. For example, suppose the request-based proposer 116a returns top-K components. Based on the eligibility criteria, the eligibility filtering component 118 may determine only 10 candidates amongst the top-K are eligible. The top-K returned components are then filtered out to create a list of 10 components. A similar process would be repeated for all such proposers.

Benefits of post-proposer filtering include it could be faster than index-level filtering, and it could be scalable to cases with a large number of items in the indexes 114. However, in certain scenarios, post-proposer filtering may require multiple steps of retrieval. For example, if the top-K candidates returned are all ineligible, then another round of retrieval might be required. To overcome this potential drawback to post-proposer filtering, if the proposers 116a through 116c are light-weight and fast, they may be able to return a large list of candidates (i.e., the value of K (in top-K) may be set to be very high). This would reduce the chances of missing out on candidates that may be relevant and eligible. Additionally, all the proposers 116a through 116c could propose the entire list of candidate components in a ranked order and, after merging and re-ranking, ineligible candidates may be filtered out.

The eligibility filtering component 118 could alternatively be implemented post processing of a reranking component 120 of the component shortlister 102. In this situation, all the proposers 116a through 116c may return their ranked list of components and the reranking component 120 would merge the outputs of the proposers 116a through 116c and re-rank them. Post reranking, the eligibility filtering component 118 would filter out the ineligible candidate(s).

A benefits of post-reranking filtering include a potential boost in recall, as filtering post-reranking assumes all component candidates have been processed and, thus, guarantees the relevant and eligible components are not filtered out. Another benefit of post-reranking filtering is it helps with multi-reasoning steps. In the first turn, suppose the top 10 components are utilized, but none of the components provide sufficient outputs. Thereafter, the component shortlister 102 may be asked to return the next 10 best components. In such cases, for the same request, the component shortlister 102 need not rerank everything again. It can simply provide the next 10 best components from the pre-computed list. A potential drawback of post-reranking filtering is an increase in latency, as the reranking is performed on a larger set of candidate components.

In some embodiments, the proposers 116a through 116c may be restricted to propose the top-K components and still filter out candidates post-reranking.

Whereas the eligibility filtering component 118 may remove components deterministically, the proposers 116a through 116c may propose components in a non-deterministic manner.

The proposers 116a through 116c may process in parallel, at least partially in parallel, or in series/sequentially (e.g., when latency is not of concern). The component shortlister 102 can selective invoke one or more of the proposers 116a through 116c, as each proposer calculates component relevancy based on a particular facet (i.e., it uses different types of evidences to calculate relevancy). The number of proposers 116 and their type/capability (e.g., serving different use cases via various retrieval engines, indexing methods, and signals) within the component shortlister 102 are configurable.

A component can consist of multiple facets such as a description, the user inputs for which the component may be relevant, etc. Additionally, there may be certain rules/policies based on which a component may be deemed relevant. These rules may be driven by logic or other deterministic policies. Each of these facets may require a different set of inputs, have different internal implementation, and can operate asynchronously. These diverse factors promote the use of multiple, independent proposers 116 within the component shortlister 102, where each proposer operates on different types of facets for measuring component relevancy and has its own internals.

Decomposing the component shortlister 102 into multiple proposers 116 provides the following advantages: (i) reduces the overall complexity of the task; (ii) each proposer 116 can be called individually and in an asynchronous fashion; (iii) decomposable design makes it easy to extend the functionality of the component shortlister 102; and (iv) helps in boosting the overall recall.

The component shortlister 102 may implement proposers 116 designed to complement each other, such that the shortcomings/inefficiencies of one can be alleviated by another.

The retrieval certainty provided by the proposers 116 may follow a common calibration protocol that simplifies the reranking step and prevents over-coupling between layers of the component shortlister 102. For example, confidence can be defined such that it reflects the expected recall. One approach to get expected recalls through calibration is by defining discrete aggregation ranges and curve fitting to convert internal raw relevance scores to corresponding recall ranges.

The request-based proposer 116a operates on the request-level (i.e., the user input level). It utilizes the request index 114a of sample user inputs to compute relevancy of components to the input request. This may be treated as a text-retrieval problem, a semantic similarity assessment problem, or both.

Request-based processing of the request-based proposer 116a is based on matching the current request (included in the request 104) to a dataset of request (e.g., user input, task request, etc.) examples that are deemed relevant for each component. The matching may be performed by embedding a representation of a query as a key and then leveraging a similarity metric for ranking. BM25, SBERT, Siamese Network, and/or other embedding-based retrieval techniques may be utilized.

Request-based processing of the request-based proposer 116a may be suitable when dealing with user inputs that correspond to those associated with components within the request index 114a, or when less contextual information is required (or available) to retrieve the relevant components. It also provides advantages in terms of latency and reliability as it has less dependency on external processing, thereby letting it start the retrieval process as soon as the request (e.g., ASR results of a spoken user input) is ready.

To extend the capabilities of the request-based proposer 116a, LLM-based augmentation may be leveraged to expand the request index 114a to matching capability beyond sample user inputs provided by component developers, schema-based, or close matches to wider semantic variations. This type of augmentation can be done offline at the time of adding new components to the request index 114a; therefore, any pre-trained LLM can be leveraged to tackle this as a typical language problem.

The request-based proposer 116a may implement one or more retrieval strategies.

The request-based proposer 116a may perform semantic similarity-based retrieval, which assesses the semantic similarity of the input request (i.e., the request 104) to the user inputs represented in the request index 114a. Semantic similarity-based retrieval can help achieve retrieval generalization.

In particular, the request-based proposer 116a may perform semantic similarity-based retrieval via embedding based shortlister (ESL). ESL inherits the advantages of semantic similarity and embedding-based retrieval approaches. ESL is a framework agnostic to the type of embedding model used underneath it. It compares the sentence embedding (i.e., sentence representation vector) between reference user inputs in the request index 114a and the input (i.e., the request 104) and proposes a component if there is a close enough match. An overview of this methodology is illustrated in FIGS. 1B and 1C.

The request index 114a may include data corresponding to individual namespaces and may thus be computed on a namespace basis. Referring to FIG. 1B, given a namespace Nj and a set of components (i.e., component1j to componentNj), the example user inputs 122, Eij, of each component are embedded using an embedding model 124, M. The example user inputs 122 per component may also be augmented, using an LLM augmentation component 126, by tasking one or more pre-trained LLMs to generate user inputs given a component description and a few example user inputs. All the components and their exemplars (e.g., both developer provided and automatically/machine generated) may then be indexed, using index creation component 128, together to generate the request index 114a. Thus, each namespace may be a pool of <componentij, Ukij>, where Ukij is user input embedding for a component belonging to Nj.

At runtime and as illustrated in FIG. 1C, upon receiving the request 104, R, the embedding model 124, M, may be used to produce an embedding 134 corresponding to the request 104. Note, the embedding model 124, M, used at runtime in FIG. 1C may be the same model used in the indexing process of FIG. 1B. The request-based proposer 116a then searches within the individual namespaces of the request index 114a to identify the most similar component(s) 132. The search may be performed using a FAISS library. An alternative to the FAISS library may be using a state-of-the-art scalable search tool (e.g., OpenSearch).

The component(s) 132 may be sorted based on their relevancy scores as determined by the request-based proposer 116a.

The processes of FIGS. 1B and 1C are a scalable approach for searching within billions of embeddings.

The request index 114a may be refreshed as soon as developers change component specifications and add or remove example user inputs with respect to components. The request index 114a may be refreshed in various ways. For example, a full index refresh per namespace may be performed. For further example, a dynamic index refresh may be performed in which only specific parts of the index are refreshed. For example, if the developer adds or deletes an example user input with respect to a component, a new item can be added to or removed from the index, instead of refreshing the entire index.

Additionally or alternatively to semantic similarity-based retrieval, the request-based proposer 116a may perform text-based retrieval. The request-based proposer 116a may use text-based retrieval to complement semantic similarity-based retrieval processes, as text-based retrieval processes can add specificity. In some cases, exactness of match is desirable. For example, assume there are two components, component_1 and component_2. Component_1 may be configured to provide bus options for traveling to a particular city, and the example user input for which component_1 is relevant is "need bus rides to Seattle". On the other hand, component_2 may be configured to provide car options for traveling to a particular city, and the example user input for which component_2 is relevant is "get me car rides to Seattle". Now suppose that a user input "need car rides to Seattle." There is a likelihood that semantic similarity-based retrieval processes match component_1 with a higher relevancy score than component_2. However, text-based retrieval processes is likely to match component_2 with a higher relevancy (which is desirable in this case).

The request-based proposer 116a is not intended to be limited to utilizing any particular text-based retrieval process. Any presently known and not yet discovered process is envisioned. For example, the request-based proposer 116a may use the Okapi BM25 algorithm, a knowledge graph-based engine, or Secure Lookup (SL) rule.

The index creation process of FIG. 1B and retrieval process of FIG. 1C may be similar for text-based retrieval processes of the request-based proposer, except the embedding model 124 may be omitted.

Referring again to FIG. 1A, the query-based proposer 116b may either implement a LLM to generate a query for search based on the request 104 and the other context 110 (e.g., including one or more previous user inputs and/or system outputs of an ongoing system-user dialog, user profile information, device context information, etc.), or the query may be provided by a LLM implemented outside the query-based proposer 116b, and even outside of the component shortlister 102. The LLM that generates the query may be customized and trained on the task of query generation. The query-based proposer 116b compares the LLM-generated query against the component descriptions in the component description index 114b.

When it comes to more contextual, multi-turn, or complex user input processing, the processing of the request-based proposer 116a may not scale as it may require dealing with an unmanageably large index space. For such cases, a LLM's understanding may be leveraged. At the inference time, the query-based proposer 116b addresses such cases by leveraging a LLM's capability to understand the conversational context, decompose complex queries, and generate a query that is suited for the retrieval system.

To enable the LLM to generate the query for the query-based proposer 116b, in addition to supervised training on annotated data, self-supervision approaches may be utilized. One possible approach is to task a LLM to generate a query by following few-shot examples and build a feedback loop. Alternatively, a recall (or human evaluated query/key relevance) can be defined for a query to be the reward function, build a reward estimator based on curated examples, then leverage it to supervise the query generation process.

Compared to the request index 114a, the index space for the component description index 114b may be smaller as it scales with number of components rather than number of user input patterns. However, it may face two challenges: (i) the latency budget for the query-based proposer 116b may be less than the request-based proposer 116a as the query-based proposer 116b may not start processing until after the user input is provided, which may come significantly after ASR results are ready; and (ii) the retrieval method of the query-based proposer 116b may require a deeper semantic understanding since it is matching developer-provided component descriptions with LLM generated queries that may not always closely follow each other.

Below is a discussion of the overall processing performed by the query-based proposer 116b, and also discussion regarding potential options to teach the LLM to generate queries that aid in the retrieval process. When the request 104 is received, the LLM is prompted to process the request and create a reformulated query considering various other context 110, such as one or more previous user inputs and/or systems outputs of an ongoing system-user dialog, user profile information, device context information, etc. The processing of the query-based proposer 116b may be similar that the semantic similarity-based retrieval processing of the request-based proposer 116a described herein above, with three main difference. First, in contrast to the request index 114a, which includes the sample user inputs of components, the component description index 114b includes component descriptions and other component related data. Second, the embedding model of the query-based proposer 116b might be different than that of the request-based proposer 116a. However, data-driven decisions may be taken to decide whether a similar model works for both or not. Third, wherein the request-based proposer 116a is tasked to identify relevancy based on similar requests, the query-based proposer 116b is tasked to identify the component descriptions that can satisfy the information need presented in the query generated by the LLM. The request-based proposer 116a consumes the request 104 as is. However, the query-based proposer 116b requires the LLM create a reformulated query based on the request 104 and other contextual signals.

The LLM may be trained in various ways to generate the query that aids in component retrieval processing of the query-based proposer 116b. In one example method, assume a dataset D consists of tuples of <r, component, c, q>, where r is the request 104, component is the relevant component corresponding to r, c is the context, and q is the desired query. With such a dataset, the LLM can be trained on the following two objectives: reformulation accuracy (given r, c task the LLM to generate q); and retrieval accuracy (given the generated q, what would be the relevancy score of the relevant component). To measure this relevancy, the request-based proposer 116a may be used. The above two objectives may be combined as a reward optimization problem. The reward could be a combination of reformulation success and retrieval success.

The rules index 114c may include one or more rules indicating when to propose components. The one or more rules may indicate to propose components based on, for example, a subscription status of the user to the component (e.g., as represented in the user's profile data), (geographic) location associated the user, (geographic) location associated the user device that captured the instant user input, a device type of the user device that captured the instant user input, and/or one or more output capabilities (e.g., display capability, audio output capability, etc.) associated the user device that captured the instant user input.

The rule-based proposer 116c provides a mechanism for proposing components based on rule-based determinations rather than retrieval determinations. For example, a rule may indicate that, for a device located in a hotel room, a "call staff for help" component is to be proposed, deterministically. Utilizing rule-based logic in this manner may prevent retrieval indexes (e.g., the request index 114a and component description index 114b) from becoming unnecessarily large.

Safe-guards may be used to prevent the rule-based proposer 116c from being abused by developers to promote their components at the cost of reducing the recall for others.

The component shortlister 102 may include a metric retriever 117 configured to retrieve component-specific data from the metric storage 115. When the reranking component 120 receive the components proposed by the request-based proposer 116a, query-based proposer 116b, and rule-based proposer 116c, the reranking component 120 may request the metric retriever 117 retrieve data corresponding to the components from the metric storage 115.

For a component, the metric storage 115 may store information such as a rate at which the component was called and provided a response, a rate at which the component was called and the system's response to the user input resulted in positive user feedback, a frequency with which the component was called with respect to user inputs of a particular user (e.g., user inputs associated with specific user profile data), and/or other component-specific metrics useful for ranking components.

While the metric retriever 117 and metric storage 115 are illustrated as being implemented within the component shortlister 102, the metric retriever 117 and metric storage 115 may be implemented outside of the component shortlister 102 without departing from the present disclosure.

The reranking component 120 receives the components proposed by the request-based proposer 116a, query-based proposer 116b, and rule-based proposer 116c, consolidates them, and reranks the consolidated components, for example, based on the metric data, received from the metric retriever 117, and/or the other context 110 (e.g., user preference data indicating a user preferred component). The reranking component 120 outputs a ranking of one or more components 112.

The reranking component 120 may be configured to limit the number of components 112 to meet a length requirement. The length requirement may be configured at the reranking level, or may be provided as an input to the component shortlister 102 as the max entries 108.

The reranking component 120 may implement one or more reranking mechanisms. For example, the reranking component may implement heuristic/rule-based ranking, where heuristic-based logic can be designed to define an ordering in terms of proposer 116 and confidence. Alternatively or additionally, the reranking component 120 may implement a LLM tasked to perform reranking of components. Additionally or alternatively, the reranking component 120 may implement model-based ranking, which leverages features from each proposed component as well as external metrics to optimize the ranking solution. Such models can be trained via a self-learning feedback loop to encourage up-ranking the right candidates.

In order to optimize for latency, certain runtime optimizations may be implemented. For example, the component shortlister 102 may asynchronously call the proposers 116. The component shortlister 102 may be accessible using an API. Within this API, methods can be utilized such that the proposers 116 within the component shortlister 102 can be called independently. For example, not all the proposers 116 need to wait for the request 104 to be generated. Some of the proposers 116, such as the request-based proposer 116a, can be called as soon as ASR results are available, in the spoken user input context. Effectively, the component shortlister 102 has the capability to call the individual proposers 116 in an asynchronous fashion to speed up the process of component shortlisting.

Figure 1D:
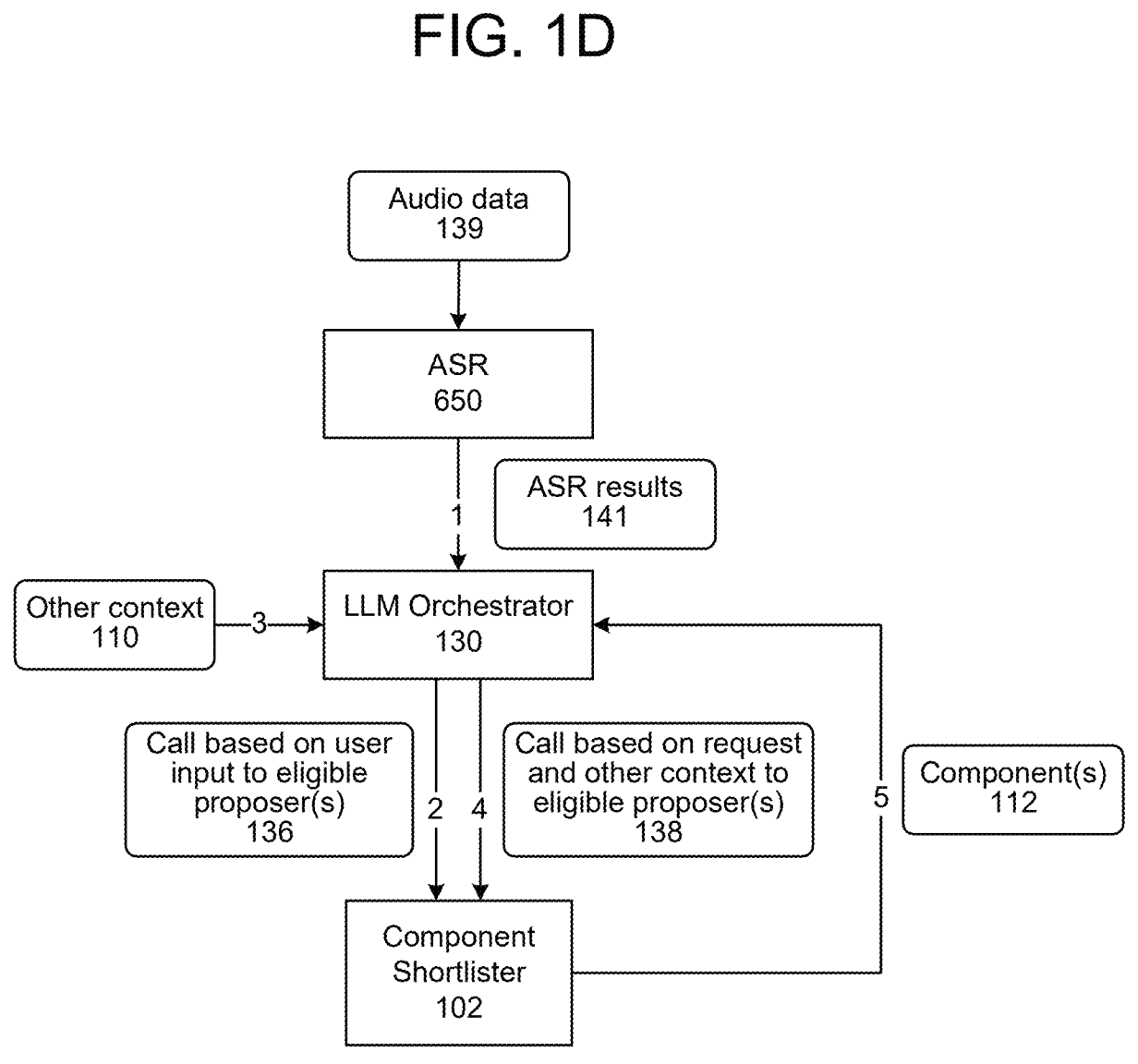

FIG. 1D illustrates an example method for asynchronously calling the proposers 116. When the user input is spoken and received by the system as audio data 139, ASR processing may be performed (by an ASR component 650 describe with respect to FIG. 6 below) on the audio data 139 to generate ASR results 141. As soon as the ASR results 141 are sent (step 1) to an LLM orchestrator component 130 or as soon as the LLM orchestrator component 130 receives text data corresponding to a non-speech user input, the LLM orchestrator component 130 may send (step 2) a call 136

(based on user input) to the request-based proposer 116a (and any other proposer 116) capable of processing with respect to the ASR results/text data. The request-based proposer 116a (and any other proposer 116 capable of processing with respect to the ASR results) can thus be "kickstarted" to find relevant components corresponding to the ASR results. This may be helpful as the indexes (including the request index 114a) of such proposers can be rather large and thus searching could be time consuming. The component shortlister 102 internally can retain the state of the proposers.

While the foregoing proposer(s) is processing, the LLM orchestrator component 130 may fetch the other context 110 from one or more data sources. After the LLM orchestrator component 130 receives (step 3) the other context 110, the LLM orchestrator component 130 (or one or more components thereof) may start its reasoning process and determine to call the component shortlister 102 to obtain one or more components believed to be useful in processing with respect to an instant task. At this time, the LLM orchestrator component 130 (or one or more components thereof) creates the request 104, which is conducive for retrieval by the component shortlister 102.

The LLM orchestrator component 130 thereafter sends (step 4) a calls 138 (based on request and other context 110) to the component shortlister 102 with the request 104 and other context 110. Based thereon, the component shortlister 102 may call the other proposer(s), such as the query-based proposer 116b and rule-based proposer 116c. The request-based proposer 116a would have already proposed its components beforehand.

The component shortlister 102 (and more particularly the reranking component 120 thereof) then merges all the proposed components from the different proposers 116, reranks them, and outputs an indication of the ranked component(s) 112, which is returned (step 5) to the LLM orchestrator component 130. One or more system components may then use the component(s) 112 as needed.

The proposers 116 need not run every time the component shortlister 102 is called. If the same request is presented to the component shortlister 102 more than once, the cached proposals of the individual proposers 116 can be utilized for processing of the subsequent request(s).

Within the component shortlister 102 can be implemented a caching mechanism for the individual proposers 116. User requests across a particular namespace, or globally, could be repetitive. For example: within a period of 5 minutes, 50 separate users may ask "what is the weather." In this case, the proposers 116 need not run for every individual request. A cache (associated with the component shortlister 102) can store the outputs of the proposers 116 and be directly used at a later stage when the same (or similar) request is received by the component shortlister 102.

As illustrated in FIG. 1E, the component shortlister 102 may receive (step 140) a first request, one or more of the proposers 116 may process (step 142) with respect to the first request to generate one or more corresponding outputs (i.e., one or more corresponding lists of one or more components determined to be relevant for the request) as described herein above, and the component shortlister 102 stores (step 144) the output(s) of the proposer(s). When storing the output(s), the component shortlister 102 may associate the output(s) with the proposer(s) that generated it. Thereafter, the component shortlister 102 may receive (step 146) a second request and determine (step 148) the second request corresponds (e.g., is the same or similar) to the first request. Based on this determination, the component shortlister 102 may, rather than calling the proposer(s) to process, retrieve (step 150) the output(s) of the proposer(s) from storage and cause (step 152) the reranking component 120 to process with respect to the proposer(s) output(s).

Note, outputs of the reranking component 120 can also or alternatively be cached. However, the metrics used by the reranking component 120 may vary across users and/or devices, etc. Thus, it may be beneficial to run the reranking component 120 more frequently than the proposers 116.

Below is described further system components and example processing of a user input. As will be noted, the component shortlister 102 can be called one or more times with respect to the processing of a single user input.

Figure 2:
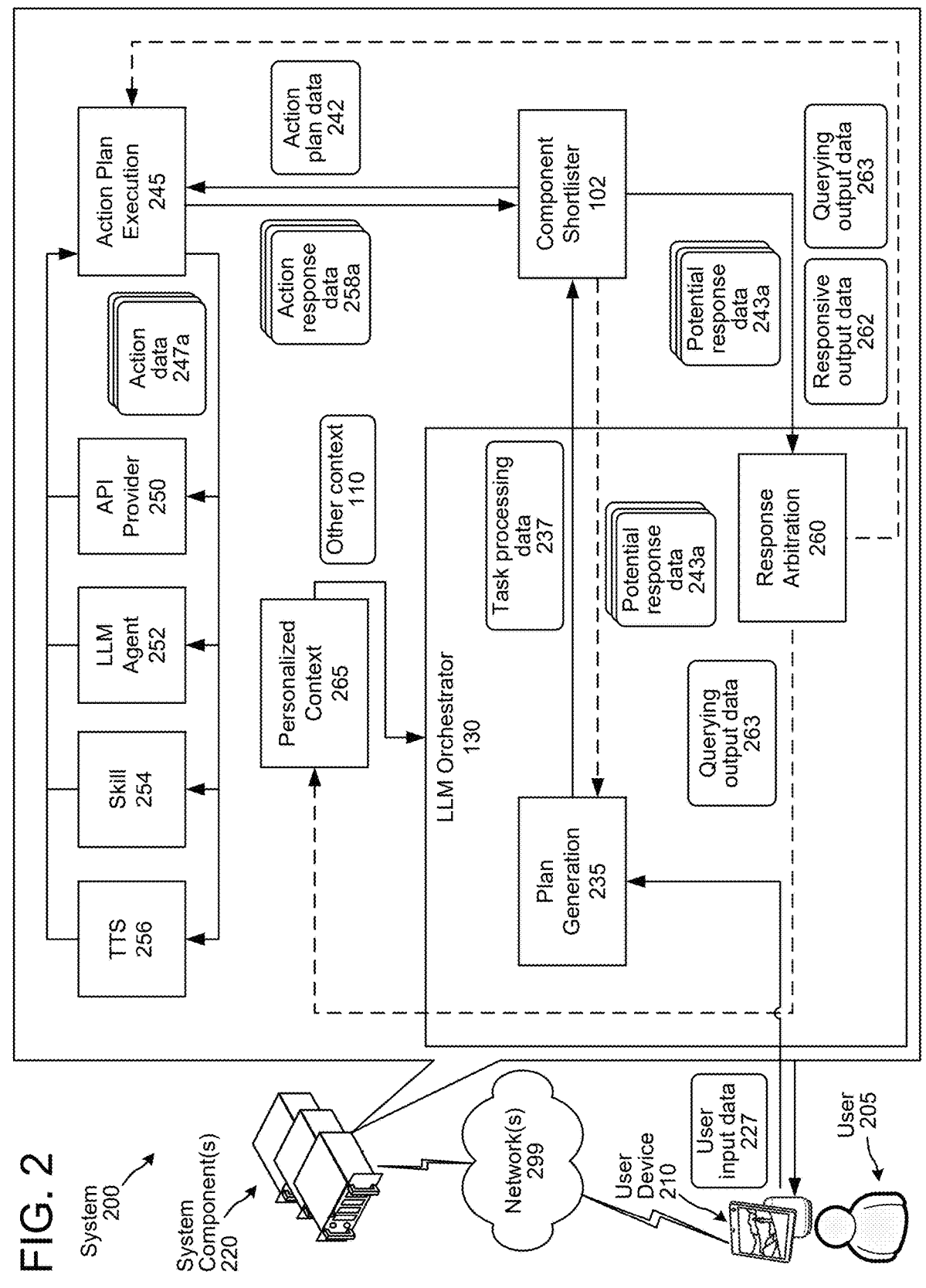
FIG. 2 is a conceptual diagram illustrating example components and processing for determining one or more components configured to perform an action associated with a task, according to embodiments of the present disclosure.

FIG. 2 illustrates a system 200 for using one or more language models to determine an action responsive to a user input. As shown in FIG. 2, the system 200 may include a user device 210, local to a user 205, in communication with a system component(s) 220 via a network(s) 299. The network(s) 299 may include the Internet and/or any other wide- or local-area network, and may include wired, wireless, and/or cellular network hardware.

The system component(s) 220 may include various components, such as the LLM orchestrator component 130, a personalized context component 265, an action plan execution component 245, an API provider component 250, an LLM agent component 252, a skill component 254, a TTS component 256, and the component shortlister 102. The LLM orchestrator component 130 may include a plan generation component 235, and a response arbitration component 260. In some embodiments, the response arbitration component 260 may exist elsewhere in the system component(s) 220 outside of the LLM orchestrator component 130.

Language modeling (LM) is the use of various statistical and probabilistic techniques to determine the probability of a given sequence of words occurring in a sentence. Language models analyze bodies of text data to provide a basis for their word predictions. The language models are generative models. In some embodiments, the language models may be LLMs. An LLM is an advanced artificial intelligence system designed to process, understand, and generate human-like text based on massive amounts of data. In some embodiments, an LLM may be further designed to process, understand, and generate multi-modal data including audio, text, image, and/or video. An LLM model may be built using deep learning techniques, such as neural networks, and may be trained on extensive datasets that include text (or other type of data, such as multi-modal data including text, audio, image, video, etc.) from a broad range of sources, such as books and websites, for natural language processing. An LLM uses an expansive training dataset, as compared to a language model, and can include a large number of parameters (in the range of billions), hence, they are called "large" language models. In some embodiments one or more of the language models (and their corresponding operations, discussed herein below) may be the same language model.

In some embodiments where one or more of the language models are LLMs, the one or more language model may be transformer-based seq2seq models involving an encoder-decoder architecture. In an encoder-decoder architecture, the encoder may produce a representation of an input (e.g., audio, text, image, video, etc.) using a bidirectional encoding, and the decoder may use that representation to perform some task. In some such embodiments, one or more of the language model may be a multilingual (approximately) 20 billion parameter seq2seq model that is pre-trained on a combination of denoising and Causal Language Model (CLM) tasks in various languages (e.g., English, French, German, Arabic, Hindi, Italian, Japanese, Spanish, etc.), and the language model may be pre-trained for approximately 1 trillion tokens. Being trained on CLM tasks, the one or more language models may be capable of in-context learning. An example of such a LLM is Alexa Teacher Model (Alexa™).

In other embodiments, where one or more of the language models are an LLM, the one or more language models may be a decoder-only architecture. The decoder-only architecture may use left-to-right (unidirectional) encoding of the input (e.g., audio, text, image, video, etc.). An example of such a LLM is the Generative Pre-trained Transformer 3 (GPT-3) and other versions of GPT. GPT-3 has a capacity of (approximately) 175 billion machine learning parameters.

Other examples of LLMs include BigScience Large Open-science Open-access Multilingual Language Model (BLOOM), Language Model for Dialogue Applications model (LaMDA), Bard, Large Language Model Meta AI (LLaMA), Titan Foundational Model, etc.

In some embodiments, the system may include one or more machine learning model(s) other than one or more of the language models. Such machine learning model(s) may receive text and/or other types of data as inputs (e.g., audio, image, video, etc.), and may output text and/or the other types of data. Such model(s) may be neural network-based models, deep learning models, classifier models, autoregressive models, seq2seq models, etc.

In embodiments where one or more of the language models are an LLM, the input to the LLM may be in the form of a prompt. A prompt may be a natural language input, for example, an instruction, for the LLM to generate an output according to the prompt. The output generated by the LLM may be a natural language output responsive to the prompt. In some embodiments, the output may be another type of data, such as audio, image, video, etc. The prompt and the output may be text in a particular language (e.g., English, Spanish, German, etc.) and/or other types of data such as audio, image, video, etc. For example, for an example prompt "how do I cook rice?", the LLM may output a recipe (e.g., a step-by-step process represented by text, audio, image, video, etc.) to cook rice. As another example, for an example prompt "I am hungry. What restaurants in the area are open?", the LLM may output a list of restaurants near the user 205 that are open at the time.

The language models may be configured using various learning techniques. For example, in some embodiments, the language models may be configured using few-shot learning. In few-shot learning, the model learns how to learn to solve the given problem. In this approach, the model is provided with a limited number of examples (i.e., "few shots") from the new task, and the model uses this information to adapt and perform well on that task. Few-shot learning may require fewer amount of training data than implementing other fine-tuning techniques. For further example, in some embodiments, the language models may be configured using one-shot learning, which is similar to few-shot learning, except the model is provided with a single example. As another example, in some embodiments, the language models may be configured using zero-shot learning. In zero-shot learning, the model solves the given problem without examples of how to solve the specific/similar problem and just based on the model's training dataset. In this approach, the model is provided with data sampled from a class not observed during training, and the model learns to classify the data.

In some embodiments, the LLM orchestrator component 130 may generate prompt data representing a prompt for input to the language models. As shown in FIG. 2, the system component(s) 220 receive user input data 227, which may be provided to the LLM orchestrator component 130. In some instances, the user input data 227 may correspond to various data types, such as text (e.g., a text or tokenized representation of a user input), audio, image, video etc. For example, the user input data may include input text (or tokenized) data when the user input is a typed natural language user input. For further example, prior to the LLM orchestrator component 130 receiving the user input data 227, another component (e.g., an automatic speech recognition (ASR) component 650) of the system 200 may receive audio data representing the user input. The ASR component 650 may perform ASR processing on the audio data to determine ASR data corresponding to the user input, which may correspond to a transcript of the user input. As described below, with respect to FIG. 6, the ASR component 650 may determine ASR data that includes an ASR N-best list including multiple ASR hypotheses and corresponding confidence scores representing what the user may have said. The ASR hypotheses may include text data, token data, ASR confidence score, etc. as representing the input utterance. The confidence score of each ASR hypothesis may indicate a level of confidence of the ASR component 650 that the corresponding hypothesis represents what the user said. The ASR component 650 may also determine token scores corresponding to each token/word of the ASR hypothesis, where the token score indicates the level of confidence of the ASR component 650 that the respective token/word was spoken by the user. The token scores may be identified as an entity score when the corresponding token relates to an entity. In some instances, the user input data 227 may include a top scoring ASR hypothesis of the ASR data. As an even further example, in some embodiments, the user input may correspond to an actuation of a physical button, data representing selection of a button displayed on a graphical user interface (GUI), image data of a gesture user input, combination of different types of user inputs (e.g., gesture and button actuation), etc. In such embodiments, the system 200 may include one or more components configured to process such user inputs to generate the text or tokenized representation of the user input (e.g., the user input data 227).

The user input data 227 may be received at the LLM orchestrator component 130 of the system component(s) 220, which may be configured to generate a list (e.g., one or more) of tasks (e.g., steps/actions) that are to be completed in order to perform an action responsive to the user input and select a task of the list of the tasks that is to be completed first (e.g., in a current iteration of processing by the system 200), as described in detail herein below with respect to FIG. 3. In instances where the plan generation component 235 generates more than one task to be completed in order to perform the action responsive to the user input, the plan generation component 235 may further maintain and prioritize the list of tasks as the processing of the system 200 with respect to the user input is performed. In other words, as the system 200 processes to complete the list of tasks, the plan generation component 235 may (1) incorporate the potential responses associated with completed tasks into data provided to other components of the system 200; (2) update the list of tasks to indicate completed (or attempted, in-progress, etc.) tasks; (3) generate an updated prioritization of the tasks remaining to be completed (or tasks to be attempted again); and/or (4) determine an updated current task to be completed. The plan generation component 235 may generate and send task processing data 237 representing the selected task to be completed and various other information needed to perform further processing with respect to the task (e.g., the user input data 227, an indication of the selected task, potential responses associated with previous tasks, the remaining task(s), and context data associated with the user input data 227, as described in detail herein below with respect to FIG. 3) to the component shortlister 102.

The component shortlister 102 may process as described herein above to determine one or more components 112 (e.g., API(s), skill component(s) 254, LLM agent component(s) 252, TTS component 256, etc.) configured to perform an action related to the user input or the current task.

In some embodiments, the task processing data 237 may represent the user input data 227, the other context 110, and/or the task selected by the task selection language model 340 to be completed first. In some embodiments, the task processing data 237 may include the remaining one or more tasks and/or may indicate the prioritization of the one or more tasks, as determined by the task selection language model 340. The shortlister prompt generation component 410 may receive the task processing data 237 and may also receive, from the component shortlister 102, relevant component data 435. In some examples, the shortlister prompt generation component 410 may request the relevant component data 435 from the component shortlister 102. That is, the shortlister prompt generation component 410 may send a request (e.g., the request 104 shown in FIG. 1A) to the component shortlister 102, where the request may include the task represented in the task processing data 237. For example, if the task processing data 237 indicates that the task is to find a pizza ordering application, then the request 104 may include that task or a representation of that task. The component shortlister 102 may process the request 104 (and any other data received from the shortlister prompt generation component 410) to determine the relevant component data 435 (e.g., the component(s) 112 shown in FIG. 1A). For example, the relevant component data 435 may include components that enable ordering of pizza or food (e.g., a component enabling pizza ordering for a specific restaurant, a component enabling generic food ordering from different restaurants, a component for enabling food delivery from a specific restaurant, etc.). As described below in relation to FIG. 4, the shortlister prompt generation component 410 may generate a prompt (for input to the shortlister language model 440) that includes a representation of the task (e.g., need a pizza delivery app), available/relevant components for performing the task (e.g., the relevant component data 435) and other information.

The component shortlister 102 may further be configured to generate and cause the execution of a request(s) (e.g., an API call(s), an incomplete API call/API call format, an indication of an action to be performed by a component, etc.) for the one or more components 112 to provide a potential responses(s) to the user input or current task (e.g., a response to a user-provided question, a paragraph from a website, etc.), which may further include a potential action (e.g., a description of a potential action, such as turning on a light, booking a flight ticket, ordering a pizza, etc.) the components are configured to perform with respect to the user input or the current task). Such requests may be represented in action plan data 242 sent to the action plan execution component 245.

The action plan execution component 245 may identify the request(s) in the action plan data 242, generate executable API calls corresponding to the request(s), and cause the corresponding components (e.g., the API provider component 250, the LLM agent component 252, the skill component 254, and/or the TTS component 256) to generate action response data 258*a-n* representing the requested potential response(s), where individual action response data 258*a* may be provided by/correspond to a particular responding component-one of the API provider component 250, the LLM agent component 252, the skill component 254, and/or the TTS component 256. The action response data 258*a-n* may include various data types including audio, text, image, video, etc. In some embodiments, the action response data 258*a-n* may include an identifier (e.g., a component name, an alphanumerical value associated with the component, etc.) for the component providing the data. The component shortlister 102 receives and processes the action response data 258*a-n* and generates potential response data 243*a-n* representing the potential response(s) (e.g., relevant potential responses, selected potential responses, ranked potential responses, etc.) for further processing (e.g., as described in detail herein below with respect to FIG. 4). If the component shortlister 102 determines that there are no remaining tasks to generate potential responses for, the component shortlister 102 may send the potential response data 243*a-n* to the response arbitration component 260.

The potential response data 243*a-n*, in some embodiments, may be determined based on receiving potential responses from various different components that may be relevant in responding to the user input data 227. For example, the potential response data 243*a-n* may include a first potential response from a first component configured to perform a first task determined by the plan generation component 235, a second potential response from a second component configured to perform a second task determined by the plan generation component 235, etc. The potential response data 243*a-n* can include more than one potential response relating to an individual task. In some embodiments, the potential response data 243*a-n* may be natural language data. In other embodiments, the potential response data 243*a-n* may be multi-modal data such as audio, image, text, video, etc.

The response arbitration component 260 processes the potential response data 243*a-n* to determine whether the potential responses generated for the one or more tasks are responsive to the user input. The response arbitration component 260 processes the potential response data 243*a-n* (representing at least the generated potential responses) and selects one or more of the potential responses that are determined to be responsive to the user input and/or determines that none of the actions are responsive to the user input. For example, the response arbitration component 260 may process the potential response data 243*a-n* to determine if one or more of the potential responses performable by the API(s) (e.g., the potential responses and/or potential actions) are responsive to the current task. In some embodiments, the response arbitration component 260 may generate a natural language summary of one or more of the selected responses and output the natural language summary to the user 205. In some embodiments, the response arbitration component 260 may further output other types of data to the user such as audio, image, video, etc. which may be included in/associated with the selected responses.

If the response arbitration component 260 determines that none of the potential responses are responsive to the user input, then the response arbitration component 260 may send an instruction to the personalized context component 265 to generate additional information (e.g., other context 110) for the user input. Additionally, or alternatively, the response arbitration component 260 may generate a natural language question to be output to the user 205 requesting the additional information. In some embodiments, the response arbitration component 260 may further output other types of data to the user such as audio, image, video, etc. which may be included in/associated with the selected responses. In such instances, the system 200 (e.g., the plan generation component 235, the component shortlister 102, and/or the response arbitration component 260) may process as described herein with further respect to the additional information (e.g., the other context 110 and/or the user-provided additional information) to perform the action responsive to the user input.

Figure 3:
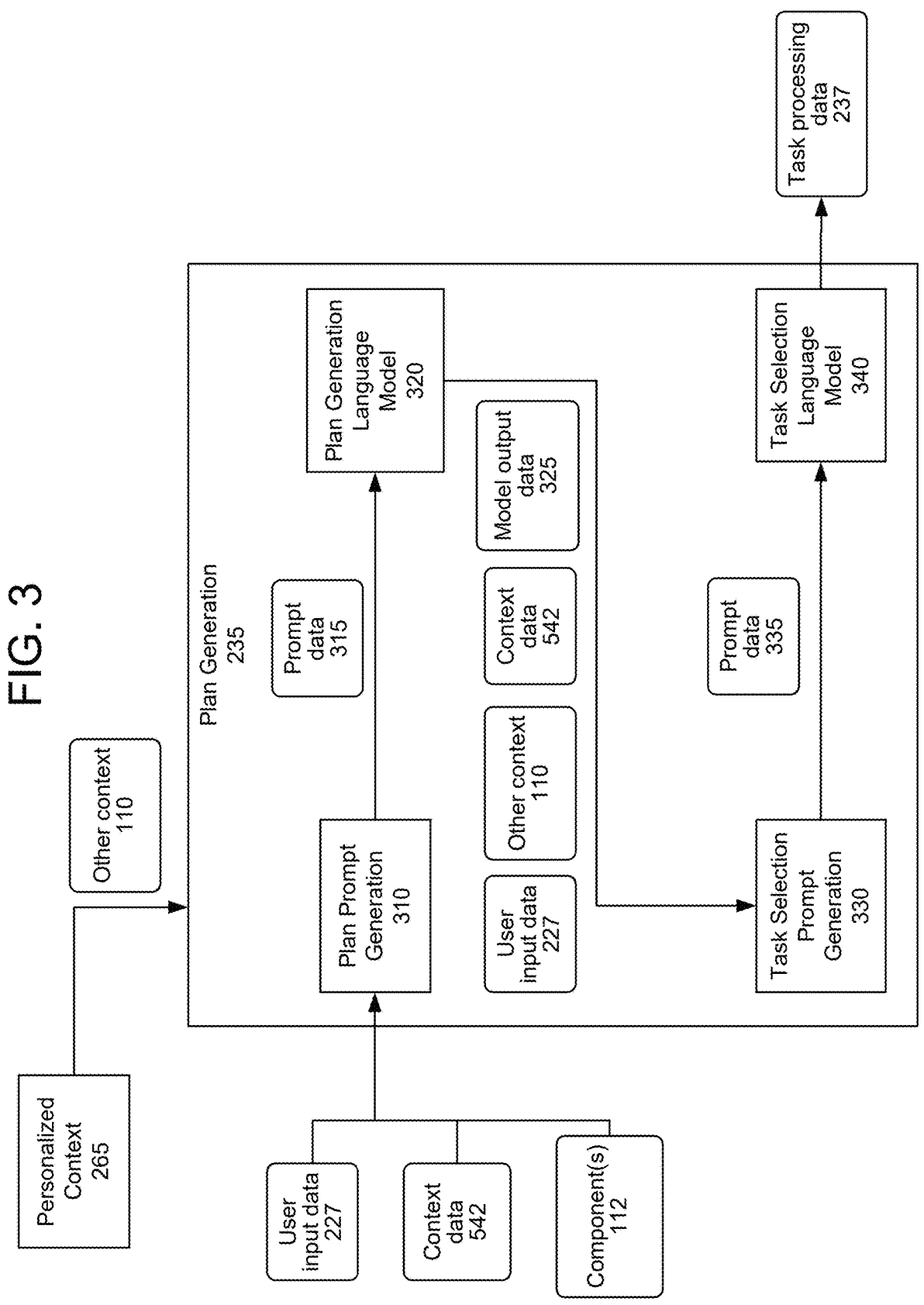
FIG. 3 is a conceptual diagram illustrating example components and processing of a plan generation component, according to embodiments of the present disclosure.

FIG. 3 illustrates example processing of the plan generation component 235. As shown in FIG. 3, the plan generation component 235 may include a plan prompt generation component 310, a plan generation language model 320, a task selection prompt generation component 330, and a task selection language model 340.

As further shown in FIG. 3, the user input data 227 is received at the plan prompt generation component 310. The plan prompt generation component 310 processes the user input data 227 to generate prompt data 315 representing a prompt for input to the plan generation language model 320. In some embodiments, the plan prompt generation component 310 may further receive an indication of one or more remaining tasks to be completed with respect to the user input data 227. A task to be completed may correspond to a task for which the system 200 has yet to generate potential responses for (e.g., for which the API provider component 250, the LLM agent component 252, the skill component 254, and/or the TTS component 256 have yet to generate action response data for). Similarly, a completed task may correspond to a task for which the system 200 has generated potential responses for (for which the API provider component 250, the LLM agent component 252, the skill component 254, and/or the TTS component 256 have generated action response data). For example, if the current iteration of processing with respect to the user input data 227 is a subsequent iteration of processing (e.g., the system previously determined that more than one task is to be completed in order to perform an action responsive to the user input data 227 and has previously generated potential responses for at least a first task of the more than one tasks), then the plan prompt generation component 310 may further receive an indication of the remaining tasks to be completed. In such embodiments, the plan prompt generation component 310 may further receive an indication of the task(s) to complete processing for and/or the potential response(s) of the processing. The plan prompt generation component 310 may further receive the context data 542 representing various contextual signals associated with the user input data 227, such as weather information, time of day, device information associated with the device that sent the user input data 227 (e.g., device ID, device states, historical device interaction data, etc.). The plan prompt generation component 310 may further receive the component(s) 112 output by the component shortlister 102. The prompt data 315 may be generated based on combining the user input data 227, the context data 542, and the component(s) 112 (and, in some embodiments, the indication of the remaining task(s), completed task(s), and/or the potential responses). In some embodiments, the prompt data 315 may be generated further based on the other context 110.

The plan prompt generation component 310 may receive the other context 110 from the personalized context component 265. As discussed herein above, the personalized context component 265 may be configured to determine and return contextual information associated with a user input to the plan prompt generation component 310, which the plan prompt generation component 310 may combine with the user input data 227 to generate the prompt data 315.

As discussed herein above, the personalized context component 265 may be caused to generate and return the other context 110 based on the system 200 determining that additional information is needed in order to generate potential responses for a task associated with a user input. For example, one or more of the components of the system 200 (e.g., the plan generation language model 320, the task selection language model 340, the shortlister language model 440, the response arbitration component 260) may determine that an ambiguity exists in the user input (or the data determined/generated as a result of processing with respect to the user input). In such examples, the personalized context component 265 may receive the user input, the current task, and/or model output data indicating that an ambiguity exists/additional information should be determined (e.g., model output data representing "Does the user prefer to use [Music Streaming Service 1] or [Music Streaming Service 2] for playing music," "I need to determine whether the user prefers [Music Streaming Service 1] or [Music Streaming Service 2] for playing music" or the like). The personalized context component 265 may process as described herein above to generate the other context 110 (e.g., "The user prefers [Music Streaming Service 1].")

In some embodiments, plan prompt generation component 310 (or another component of the system 200) may process the other context 110, the user input data 227, and/or the potential responses associated with the user input data 227 to generate a natural language representation of the user input (represented by the user input data 227) that is updated to include the contextual information of the other context 110 (e.g., a contextual rewrite of the user input). Thereafter, the plan prompt generation component 310 may process to generate the prompt data 315 using the updated user input data.

In some embodiments, the prompt data 315 may be an instruction for the plan generation language model 320 to determine one or more tasks (e.g., steps/actions) that are to be completed in order to perform an action responsive to the user input given the other information (e.g., the other context 110, the indication of the remaining task(s), the indication of the completed task(s), and/or the corresponding potential responses) included in the prompt data 315.

In some embodiments, the plan prompt generation component 310 may also include in the prompt data 315 a sample processing format to be used by the plan generation language model 320 when processing the prompt. In some embodiments, the plan prompt generation component 310 may generate the prompt data 315 according to a template format. For example, the prompt data 315 may adhere to a template format of:

```
{
Create a new task if necessary to help complete a request to [user
input data 227 (or a representation of a determined intent of the
user input data 227].
Here are the completed tasks, the potential responses, user inputs,
and context so far:
[completed tasks, the potential responses, dialog history, context
data 542, other context 110]
These are the remaining tasks to be completed:
[remaining task data]
Based on the result, create new tasks to be completed, if necessary.
Return the tasks as an array.
}
```

In some embodiments, the template format may instruct the plan generation language model 320 as to how it should process to generate the one or more tasks (e.g., steps) that are to be completed. In some embodiments, the format may further include an indication, such as a label of "User:" indicating the following string of characters/tokens as the user input. In some embodiments, the format may further include a label of "Thought:" instructing the plan generation language model 320 to generate an output representing the determined interpretation of the user input by the plan generation language model 320 and/or an action that should be taken (e.g., the user is requesting [intent of the user input], the user is trying to [intent of the user input], need to determine [information needed to properly process the user input], etc.). In some embodiments, the format may further include an indication of "Observation:" indicating the following string of characters/tokens as the result of performance of an action determined by the plan generation language model 320/the plan generation language model 320's interpretation of the result of the performance of the action determined by the plan generation language model 320 (e.g., the completed tasks and/or their potential responses). In some embodiments, the format may further include an indication of "Response:" instructing the plan generation language model 320 to generate a response (e.g., one or more tasks to be completed) to the prompt.

Following such a template format, for example, and for a user input of "turn on all of the lights except the garage," the plan prompt generation component 310 may generate example prompt data 315a:

```
{
Create a new task if necessary to help complete a request to turn on
all of the lights except the garage.
Here are the completed tasks, their potential responses, user inputs,
and context so far:
[ ]
These are the remaining tasks to be completed:
[ ]
Based on the result, create new tasks to be completed, if necessary.
Return the tasks as an array.
}
```

As an example of a user input that is associated with more than one task, the system 200 may receive a user input of "please order some pizza for dinner" and may determine a task list of "identify user pizza preference" and "find application that enables ordering of pizza." Thereafter, the system 200 may process as described herein below to select and complete the task of "identify user pizza preference." The plan prompt generation component 310 may process the user input, corresponding context data, the remaining task list, and the potential responses (e.g., the users pizza preference, determined, for example, by the personalized context component 265) to generate example prompt data 315a:

```
{
Create a new task if necessary to help complete a request to order
some pizza for dinner.
Here are the completed tasks, their potential responses, user inputs,
and context so far:
Completed tasks:
    Identify user pizza preference: user ordered Brooklyn style
pizza from [Company name]
These are the remaining tasks to be completed:
Find application to order pizza
Based on the result, create new tasks to be completed, if necessary.
Return the tasks as an array.
}
```

In some embodiments, the plan prompt generation component 310 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data 315 may include "Please generate a polite, respectful, and safe response and one that does not violate protected class policy."

The plan generation language model 320 processes the prompt data 315 to generate model output data 325 representing one or more predicted tasks to be completed in order to perform the action responsive to the user input. For example, based on processing the first example prompt data provided above, the plan generation language model 320 may output model output data 325*a*: {"turn on all of the lights except the garage light,"} or the like. For further example, as discussed above, based on processing prompt data corresponding to the user input "please order some pizza for dinner" the plan generation language model 320 may output model output data 325*b*: {"identify user pizza preference;" "find application that enables ordering of pizza," or the like. After the first task of "identify user pizza preference" is complete, and based on processing the second example prompt data provided above, the plan generation language model 320 may further output model output data 325*c*: {"find an application to order pizza" "find API to order [Company name] pizza,"} or the like. In some embodiments, the threshold for determining the one or more tasks may be such that the plan generation language model 320 is encouraged to generate multiple predicted tasks for a given user input, where the system 200 may parse and filter the list of tasks during downstream processing (e.g., during the processing of the task selection language model 340). For example, based on processing the first example prompt data provided above, the plan generation language model 320 may output model output data 325*d*: {"turn on all of the lights except the garage light," "turn on all lights," "identify which garage light," "turn on all lights then turn off garage light," "turn on all lights where user is located," "turn on kitchen lights, living room lights, dining room lights, hallways lights" "turn on all lights on first floor,"} or the like.

The model output data 325 is sent to the task selection prompt generation component 330, which processes the model output data 325 to generate prompt data 335 representing a prompt for input to the task selection language model 340. In some embodiments, such prompt data 335 may be generated based on combining the user input data 227, the other context 110, the prompt data 315, and/or the model output data 325. In some embodiments, the plan generation component 235 may include another component that parses the model output data 325 to determine the one or more tasks and may send a representation of the one or more tasks to the task selection prompt generation component 330.

In some embodiments, the prompt data 335 may be an instruction for the task selection language model 340 to select a task of the one or more tasks that is to be completed first (e.g., completed during the current iteration of processing) given the information (e.g., user input data 227, the other context 110, and the one or more tasks) included in the prompt data 335. In some embodiments, the prompt data 335 may further include an instruction for the task selection language model 340 to determine a priority of the one or more tasks (e.g., an ordered list representing the order in which the one or more tasks are to be completed). As discussed above, with respect to the plan prompt generation component 310, in some embodiments, the task selection prompt generation component 330 may also include in the prompt data 335 a sample processing format to be used by the task selection language model 340 when processing the prompt. Similarly, in some embodiments, the task selection prompt generation component 330 may generate the prompt data 335 according to a template format, such as:

```
{
Select the top prioritized task given the ultimate goal of [user input
data 227 (or a representation of a determined intent included in the
user input data 227]
Here are the completed tasks, their potential responses, and user
inputs so far:
[completed tasks, potential responses associated with the tasks,
dialog history, context data, other context 110]
Here are the task candidates:
[remaining tasks]
Return your selected task, return None if the goal is achieved or
indicate existing ambiguities.
}
```

In some embodiments, the template format may instruct the task selection language model 340 as to how it should process to select the task and/or prioritize the one or more tasks. In some embodiments, as discussed above, the format may further include indications of the "User:", "Thought:", "Action:", "Observation:", and/or "Response:" indicators.

Following such a template format, for example, and for the first example user input provided above of "turn on all of the lights except the garage," the task selection prompt generation component 330 may generate example prompt data 335*a*:

```
{
Select the top prioritized task given the ultimate goal of turn on all
of the lights except the garage
Here are the completed tasks, their potential responses, user inputs,
and context so far:
[ ]
Here are the task candidates:
Turn on all of the lights except the garage light
Return your selected task, return None if the goal is achieved or
indicate existing ambiguities.
}
```

For further example, for the second example user input provided above of "please order some pizza for dinner," the task selection prompt generation component 330 may generate example prompt data 335*b*:

```
{
Select the top prioritized task given the ultimate goal of please
order some pizza for dinner
Here are the completed tasks, their potential responses, user inputs
and context so far:
Completed tasks:
    Identify user pizza preference: user ordered Brooklyn style
pizza from [Company name]
Here are the task candidates:
find an application that sells pizza
find API that sells [Company name] pizza
Return your selected task, return None if the goal is achieved or
indicate existing ambiguities.
}
```

In some embodiments, the task selection prompt generation component 330 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data may include "Please generate a polite, respectful, and safe response and one that does not violate protected class policy."

The task selection language model 340 processes the prompt data 335 to generate model output data representing the task to be completed first and/or a prioritization of the one or more tasks. For example, based on processing the first example prompt data provided above, the task selection language model 340 may output model output data: {"1. Turn on all of the lights except the garage light,"} or the like. For further example, based on processing the second example prompt data provided above, the task selection language model 340 may output model output data: {"1. Find an API that sells [Company name] pizza,"} or the like. In some embodiments, during processing of the task selection language model 340 to select and/or prioritize the one or more tasks, the task selection language model 340 may update the task list to remove any redundant and/or conflicting tasks. For example, for the second example prompt data, the task selection language model 340 may determine that the remaining tasks of "find an application that sells pizza" and "find an API that sells [Company name] pizza" are redundant, and that "find an API that sells [Company name] pizza has a higher priority. Therefore, the task selection language model 340 may remove the task of "find an application that sells pizza" from the remaining task list. Thereafter, the plan generation component 235 (or another component of the plan generation component 235) may process the model output data of the task selection language model 340 to determine task processing data 237 representing the user input data 227, the other context 110, and/or the task selected by the task selection language model 340 to be completed first. In some embodiments, the task processing data 237 may include the remaining one or more tasks and/or may indicate the prioritization of the one or more tasks, as determined by the task selection language model 340. The task processing data 237 may be sent to the component shortlister 102, which is described in detail herein below with respect to FIG. 4.

Figure 4:
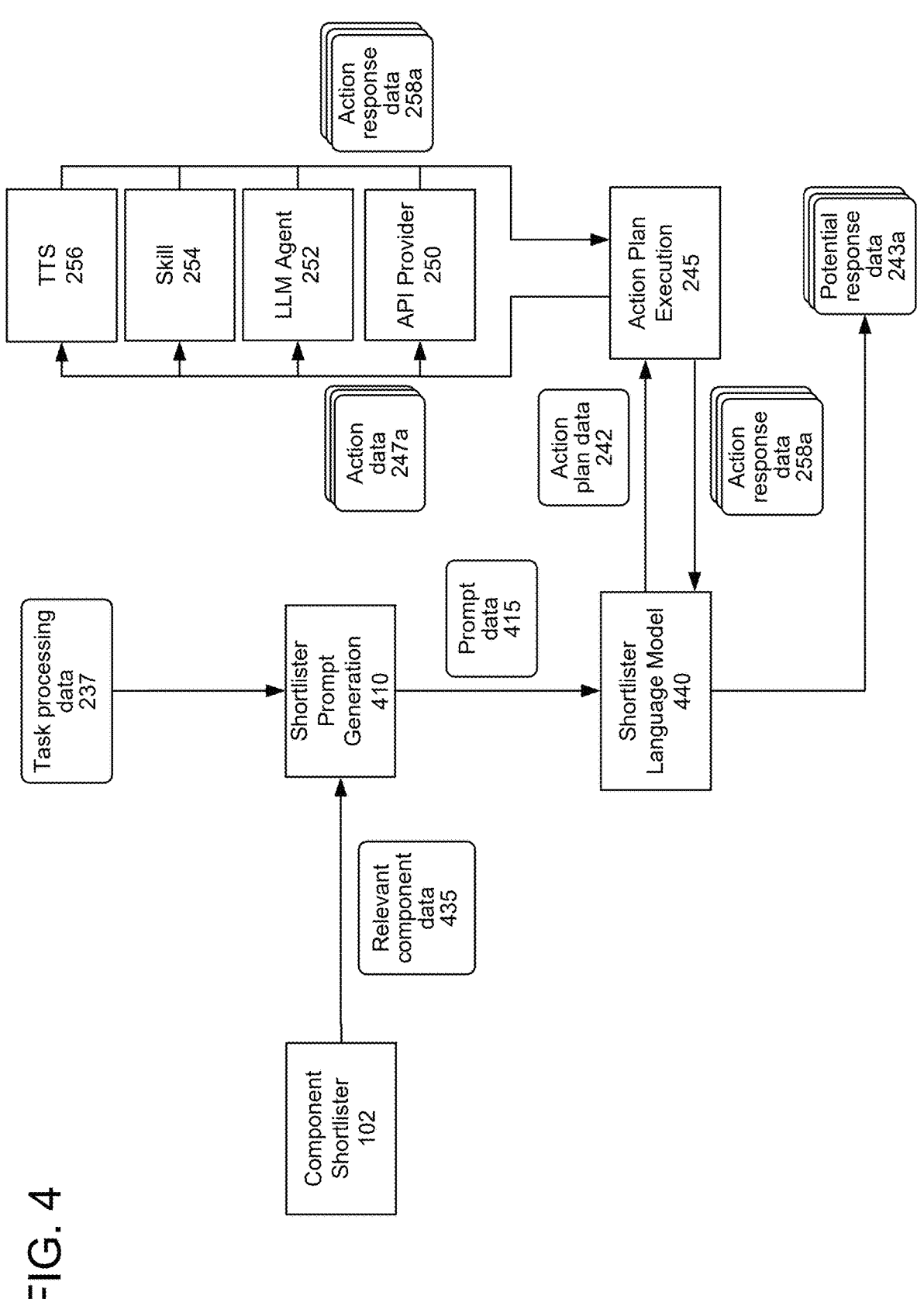
FIG. 4 is a conceptual diagram illustrating example components and processing to generate potential response data, according to embodiments of the present disclosure.

FIG. 4 illustrates example processing to generate the potential response data 243. As shown in FIG. 4, the task processing data 237 is received at the shortlister prompt generation component 410. The shortlister prompt generation component 410 processes the task processing data 237 to generate prompt data 415 representing a prompt for input to the shortlister language model 440. In some embodiments, such prompt data 415 may be generated based on combining the task processing data 237 (e.g., the user input data 227, the selected task, remaining tasks, potential responses associated with one or more previous tasks, etc.) and relevant component data 435 representing one or more components 112 associated with the user input data 227 and/or the current task.

The relevant component data 435 may be generated by the component shortlister 102 as described in detail herein above. For example, the components may correspond to rule-based components, ML-based components, LLM-based components, or the like, such as the personalized context component 265, the skill component(s) 254, the LLM agent component(s) 252, the TTS component 256, the orchestrator component 630, etc.

In some embodiments, the prompt data 415 may be an instruction for the shortlister language model 440 to determine one or more APIs that are to process with respect to the user input or the current task (e.g., determine one or more API calls to cause the APIs to process) given the information (e.g., the user input data 227, the other context 110, the current task, and the relevant component data 435). As discussed above, with respect to the plan prompt generation component 310 and the task selection prompt generation component 330, in some embodiments, the shortlister prompt generation component 410 may also include in the prompt data 415 a sample processing format to be used by the shortlister language model 440 when processing the prompt. Similarly, in some embodiments, the shortlister prompt generation component 410 may generate the prompt data 415 according to a template format, such as:

```
{
  You are an AI agent to find and execute an API to complete the
  task of [user input data 227 / current task]
  Here are a list of relevant API available:
  [API data 535]
  Use the following format:
  Thought: think about what to do
  API: API calls compatible with the task
  Observation: the result of the API call
  Summary: summarized results from the API call
  If no appropriate API is found, summarize as nothing is found.
}
```

Following such a template format, for example, and for a selected task of "turn on all of the lights except the garage light" and corresponding relevant API data, the shortlister prompt generation component 410 may generate example prompt data 415a:

```
{
  You are an AI agent to find an execute an API to complete the task
  of turn on all of the lights except the garage light
  Here are a list of relevant API available:
  Let's chat API
  Classic NLU API
  Smart Home skill
  Use the following format:
  Thought: think about what to do
  API: API calls compatible with the task
  Observation: the result of the API call
  Summary: summarized results from the API call
  If no appropriate API is found, summarize as nothing is found.
}
```

In some embodiments, the shortlister prompt generation component 410 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data may include "Please generate a polite, respectful, and safe response and one that does not violate protected class policy."

The shortlister language model 440 processes the prompt data 415 to generate one or more API calls corresponding to request(s) that the corresponding APIs return a potential response to the user input/current task and/or a potential action(s) that the APIs are configured to/will perform with respect to the user input and/or the current task (e.g., a natural language description of the potential action(s)). As such, in some embodiments, the shortlister language model 440 may generate API calls for a subset of the APIs represented in the prompt data 415. The shortlister language model 440 may generate the one or more APIs calls (including the required input parameters) by applying in-context learning for cold-starting APIs (e.g., one-shot/few-shot learning). For example, in embodiments where the relevant component data 435 includes the API descriptions, the shortlister language model 440 may use the one or more exemplars included in the API descriptions (included in the prompt data 415) to determine the one or more input parameters for the API call. In some embodiments, the shortlister language model 440 may be finetuned on such exemplars (e.g., during offline or runtime processing), such that the shortlister language model 440 is capable of determining the one or more input parameters for the given API call.

During processing of the shortlister language model 440 and after generating the one or more requests, the shortlister language model 440 may cause the one or more requests to be executed. For example, as shown in FIG. 4, the shortlister language model 440 may send action plan data 242 representing the one or more requests to the action plan execution component 245, which causes execution of the one or more requests included in the action plan data 242. For example, the action plan execution component 245 may process the action plan data 242 to generate action data 247*a-n*. Action data 247*a* may represent, for example, an instruction (e.g., an executable API call determined from/generated based on the action plan data 242) for a particular API to process with respect to the user input and/or the current task. In embodiments where the action plan data 242 includes requests corresponding to incomplete API calls, API call formats, indications of actions to be performed by one or more components, the action plan execution component 245 may be configured to generate executable API calls corresponding to the action plan data 242. In some embodiments, the action plan execution component 245 may generate the action data 247*a-n* to represent an instruction to provide the responses including the potential response(s)/potential action(s) with respect to the user input and/or the current task.

The action plan execution component 245 may send the action data 247*a-n* to the API provider component 250, the LLM agent component 252, the skill component 254, and/or the TTS component 256. The API provider component 250 may include one or more components (e.g., rule-based components, ML-based components, LLM-based components, or the like) that may be caused to process using the action data 247*a-n*.

As discussed herein above, the system 200 may include the TTS component 256, the skill component 254, and the LLM agent component 252.

As discussed above, the API provider component 250 may include various components that may be caused to execute using the action data 247*a-n*. For example, the API provider component 250 may include an entity recognition (ER) component, which may be configured to process textual or tokenized input to link one or more entity references included in the textual or tokenized input to a specific corresponding entity known to the system 200. For example, based on the textual or tokenized input (e.g., a context of the textual or tokenized input), the ER component may determine that a reference to "Neil Armstrong" is directed to the American astronaut. In some embodiments, the action data 247*a-n* may include an indication(s) (e.g., slots) of one or more entities included in the user input, as determined by one or more of the language models 420, 440, 540, in which case the ER component may process to link the one or more entities to the specific, referenced, entity known to the system 200.

In other embodiments, the ER component may be configured to process the action data 247*a-n* to determine the one or more entities included in the user input and link the one or more determined entities to the specific, referenced, entity (entities) known to the system 200. For example, the ER component may include one or more recognizers. Each recognizer may include a named entity recognition (NER) component. The NER component applies grammar information and lexical information (received from a storage) associated with a domain (associated with the recognizer implementing the NER component) to determine a mention of one or more entities in text data. In this manner, the NER component identifies "slots" (each corresponding to one or more particular words in text data) that may be useful for later processing. The NER component may also label each slot with a type (e.g., noun, place, city, artist name, song name, etc.). Thereafter, the ER component links a slot of text data to a specific entity known to the system. To perform entity resolution, the ER component may utilize gazetteer information stored in an entity library storage. The gazetteer information may be used to match text data (representing a portion of the user input) with text data representing known entities, such as song titles, contact names, etc. Gazetteers may be linked to users (e.g., a particular gazetteer may be associated with a specific user's music collection), may be linked to certain domains (e.g., a shopping domain, a music domain, a video domain, etc.), or may be organized in a variety of other ways.

For further example, the API provider component 250 may include a search component, which may be configured to query a storage (e.g., a database, repository, knowledge base, etc.) for information usable for generating a response to a user input. For example, if the action data 247*a-n* represents a request for information of "Who won the game between [Team 1 Name] and [Team 2 Name]," then the search component may query the storage (or other sources, such as the Internet), to retrieve the information "[Team 1 Name] won the game between [Team 1 Name] and [Team 2 Name]."

As an even further example, the API provider component 250 may include the device controller component discussed herein above, which may be further configured to cause a device to perform an action corresponding to the action data 247*a-n*.

In some embodiments, the API provider component 250 may include a domain service component, which may be configured for interacting with one or more services defined by particular users, such as developers, specialists, or the like (e.g., to receive information, such as responses or annotations, to cause an action.

The API provider component 250, the LLM agent component 252, the skill component 254, and/or the TTS component 256 may send action response data 258*a-n* representing one or more potential responses generated by the one or more APIs corresponding to the action data 247*a-n* (e.g., the potential response(s) and/or potential action(s)) to the action plan execution component 245. For example, in response to an API call to the skill component 254 associated with a user input for turning on a light, the action response data 258*a* may correspond to a potential action of "turn on the light," "turn_on_device ("light", [device ID])", or the like. For further example, in response to an API call to the skill component 254 associated with a user input for ordering a pizza from a particular restaurant, the action response data 258*b* may correspond to a potential action of "order medium pizza from [restaurant name]", "order_pizza ("medium", "pizza", "[restaurant name]")", or the like. The action plan execution component 245 may send the action response data 258*a-n* to the shortlister language model 440.

In some embodiments, the shortlister language model 440 may process the action response data 258a-n to generate a natural language summary of the action response data (e.g., the potential response data 243a-n). In some embodiments, the potential response data 243a-n may include an association between action response data 258a (or a summarized representation of the action response data 258a) and an indication of the API/component that generated the action response data 258a (e.g., a component identifier, API description, etc.). In some embodiments, the shortlister language model 440 may be configured to filter and/or rank the action response data 258a-n based on how relevant the action response data 258a-n is to the current task. In some embodiments, the shortlister language model 440 may be configured to filter and/or rank the action response data 258a-n based on a confidence level of the component that provided the action response data, where the confidence level may indicate a likelihood of the component being able to respond (e.g., within a period of time), the component being able to perform a potential action that corresponds to the current task, etc. In some embodiments, the action response data 258a-n may indicate whether or not the corresponding component is able to respond (e.g., the action response data 258a may include a Boolean value such as "yes" or "no" or other similar indications). In some embodiments, the shortlister language model 440 may filter and/or rank the action response data 258a-n based on information included in the prompt data 415 (e.g., the user input data 227, the relevant component data 435, the context data 542 the other context 110, the prompt data 315, etc.). For example, the potential response data 243a-n may include a subset of the action response data 258a-n (or the summarized representations of the action response data 258a-n) and may further include a representation of a confidence associated with the action response data 258a (or a summarized representation of the action response data 258a). As such, the potential response data 243a-n may further include data representing a confidence of how relevant the action response data 258a is to the current task. In some embodiments, the shortlister language model 440 may consider a rating associated with the component that provided the action response data 258a, where the rating may be a user satisfaction rating provided by multiple different users of the system 200, a user satisfaction rating provided by the user 205 associated with the user input data 227, a system generated rating based on the number of past tasks handled by the component, a accuracy rating based on the number of past tasks the component had handled correctly/provided a desired response for, etc.

The shortlister language model 440 may send the potential response data 243a-n for further processing. In instances where the plan generation component 235 determined that more than one task is to be completed, the shortlister language model 440 may send the potential response data 243a-n to the plan generation component 235, which may process as described herein above to maintain and prioritize the task list based on the potential response data 243a-n and select a new task to be completed. In instances where the plan generation component 235 determined that only one task is to be completed, or in instances where the shortlister language model 440 determines that there are no remaining tasks to be completed, the shortlister language model 440 may send the potential response data 243a-n, and the potential responses associated with previously completed tasks (e.g., previous action response data) to the response arbitration component 260 to process as discussed herein above. The shortlister language model 440 may further send the user input data 227, the context data 542, the other context 110, etc., to the plan generation component 235 and/or the response arbitration component 260.

In some embodiments, the LLM orchestrator component 130 may further include a memory storage (not illustrated) which may store various information associated with the processing performed (e.g., user input data 227, the prompt data 315, the context data 542, the other context 110, the model output data 325, prompt data 335, the task processing data 237, the relevant component data 435, the prompt data 415, the action plan data 242, the action response data 258a-n, the potential response data 243a-n, etc.) during one or more previous iterations of processing by the LLM orchestrator component 130 for the user input data 227. As such, after the shortlister language model 440 generates the potential response data 243a-n, the LLM orchestrator component 130 may send the abovementioned data to the memory storage. In some embodiments, the above-mentioned data may be sent to the memory storage as it is generated by the system 200.

In such embodiments, one or more of the prompt generation components discussed herein may be configured to include (e.g., append) one or more portions of the data included in the memory storage in the data (e.g., the generated prompts) to the corresponding language models. For example, during a subsequent iteration of processing, the plan prompt generation component 310 may receive one or more portions of the data included in the memory storage (which were generated during one or more previous iterations of processing performed with respect to the user input data 227) and include the one or more portions of data in the prompt data 315.

As discussed herein above, the shortlister language model 440 may be configured to determine whether additional information is needed in order to complete the current task (e.g., if an ambiguity exists in the user input data 227 or the current task, if the current task is to resolve an identified ambiguity, if an API argument is missing from the user input or other available data, etc.), in which case the shortlister language model 440 may send data representing a request for such additional information to the response arbitration component 260. In some embodiments, the action plan data 242 may represent the request for additional information, and the action plan execution component 245 may be configured to send corresponding action data 247 to the personalized context component 265. For example, for the example provided herein above with respect to ordering pizza, the shortlister language model 440 may determine that in order to resolve an ambiguity with respect to the user input data 227 or current task (e.g., based on the current task being to resolve the ambiguity or a determination that the current task cannot be completed due to the ambiguity), the system 200 must "identify user pizza preference," or the like. The system 200 may send a request to the personalized context component 265 to "identify user pizza preference" and the personalized context component 265 may process as described herein above to return personalized context data resolving the ambiguity (e.g., the user's pizza preference may be determined to be a cheese pizza or a pepperoni pizza).

In some embodiments, the language models 420, 440, 540, 220 may be fine-tuned to perform a particular task(s). Fine-tuning of the language models 420, 440, 540, 220 may be performed using one or more techniques. One example fine-tuning technique is transfer learning that involves reusing a pre-trained model's weights and architecture for a new task. The pre-trained model may be trained on a large, general dataset, and the transfer learning approach allows for efficient and effective adaptation to specific tasks. Another example fine-tuning technique is sequential fine-tuning where a pre-trained model is fine-tuned on multiple related tasks sequentially. This allows the model to learn more nuanced and complex language patterns across different tasks, leading to better generalization and performance. Yet another fine-tuning technique is task-specific fine-tuning where the pre-trained model is fine-tuned on a specific task using a task-specific dataset. Yet another fine-tuning technique is multi-task learning where the pre-trained model is fine-tuned on multiple tasks simultaneously. This approach enables the model to learn and leverage the shared representations across different tasks, leading to better generalization and performance. Yet another fine-tuning technique is adapter training that involves training lightweight modules that are plugged into the pre-trained model, allowing for fine-tuning on a specific task without affecting the original model's performance on other tasks.

In some embodiments, one or more components of the system 200 discussed herein above may be configured to begin processing with respect to data as soon as the data or a portion of the data is available to the one or more components. Some components of the system 200 are generative components/models that can begin processing with respect to portions of data as they are available, instead of waiting to initiate processing after the entirety of data is available. In other words, the system 200 may be configured to stream portions of data associated with processing with respect to a user input to the one or more components such that the one or more components may begin performing their configured processing with respect to that data as soon as it is available to the one or more components. For example, if the output of the plan generation language model 320, the task selection language model 340, and/or the shortlister language model 440 indicates that additional information is needed to complete a first task associated with a user input, a request for the additional information may be sent to the personalized context component 265. Thereafter, the plan generation language model 320, the task selection language model 340, and/or the shortlister language model 440 may continue to process to complete their configured operations. For example, while the personalized context component 265 is processing to determine the additional information, the system 200 may begin processing with respect to a second task associated with the user input. Thereafter, the output of the personalized context component 265 may be sent to the response arbitration component 260 such that once the response arbitration component 260 receives the output of the shortlister language model 440, the response arbitration component 260 may resolve the ambiguity that resulted in the request for additional information in order to generate the responsive output data 262. For further example, if the user input data 227 is generated to include the natural language representation of the user input, but the processing required to determine the corresponding contextual signals (e.g., weather data, time of data, dialog history, device information, etc.) is yet to be completed, the plan generation component 235 may begin processing with respect to the natural language representation of the user input. Once the corresponding contextual signals have been generated, the plan generation component 235 may begin processing with respect to the contextual signals and may update downstream components with the result of the processing with respect to the contextual signals.

As another example, if the plan generation component 235 determines that more than one task is to be completed to perform an action responsive to a user input, and the shortlister language model 440 processes as described herein above to cause one or more components to generate potential responses with respect to a first task of the more than one tasks, the shortlister language model 440 may send the potential responses (and a representation of the user input and the current task) to the response arbitration component 260 to process as described herein above with respect to those potential responses while the system 200 (e.g., the plan generation component 235 and/or the shortlister language model 440) completes processing with respect to the remaining tasks of the one or more tasks. Therefore, the response arbitration component 260 may process as described herein to select between the potential responses associated with the first task while the potential responses associated with one or more of the remaining tasks is completed. As such, the response arbitration component 260 may only need to arbitrate between the potential responses associated with the first task that were previously selected by the response arbitration component 260 as being responsive to the first task when the response arbitration component 260 later processes with respect to further potential responses associated with further tasks.

As a further example, if the component shortlister 102 determines (e.g., with a confidence value that meets or exceeds a particular threshold) that a particular component or component description should be included in the relevant component data 435, the component shortlister 102 may provide the corresponding relevant component data 435 to the shortlister prompt generation component 410 so that the shortlister prompt generation component 410 may begin processing with respect to the relevant component data 435 while the component shortlister 102 continues to determine one or more further relevant component data. In general, the system 200 is capable of performing such streaming and processing of portions of data discussed herein (e.g., for processing with respect to a user input) and updating downstream components with the results of processing of newly available portions of data as the data becomes available for processing.

Figure 5:
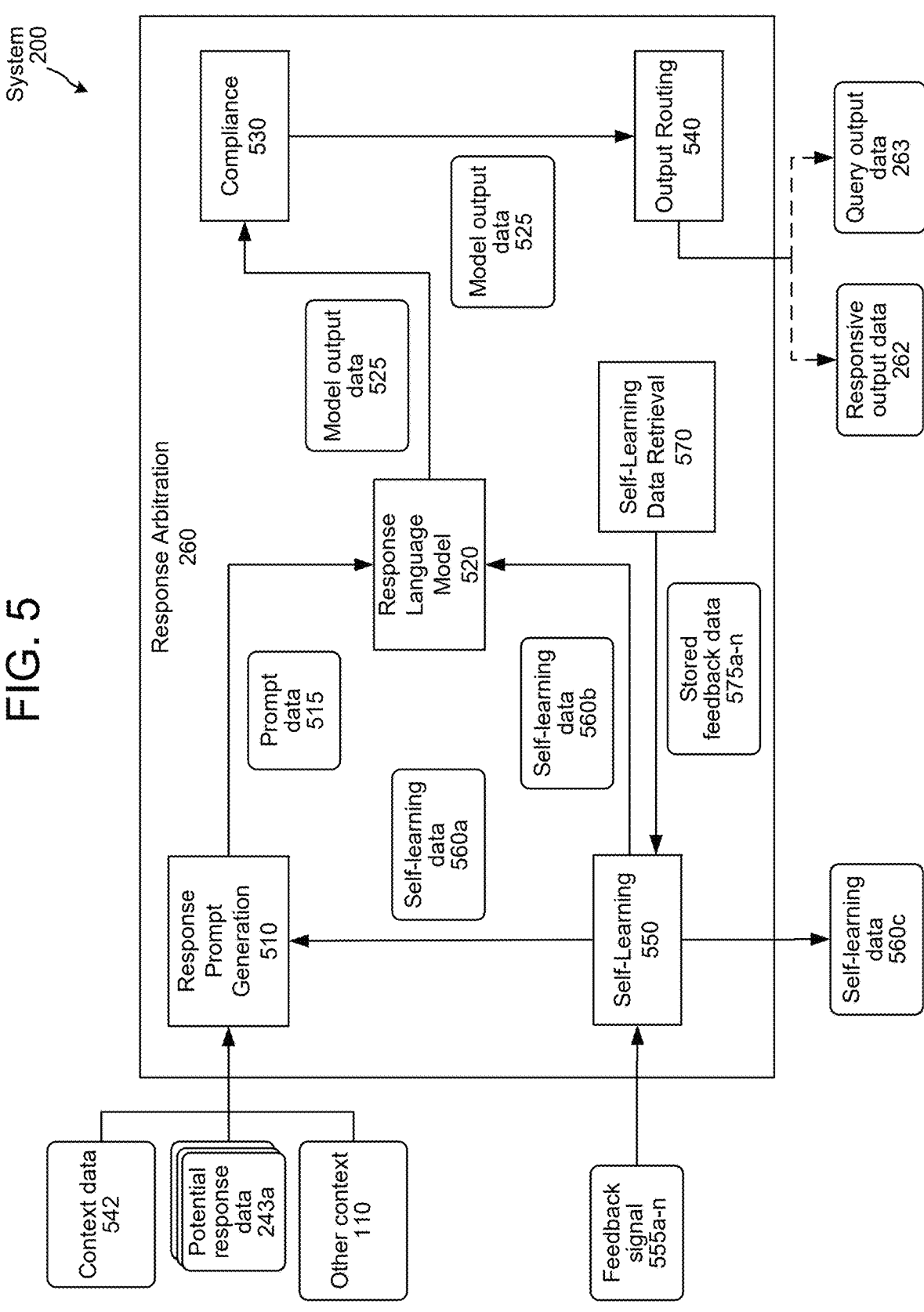
FIG. 5 is a conceptual diagram illustrating example components and processing of a response arbitration component, according to embodiments of the present disclosure.

FIG. 5 illustrates example components and processing of the response arbitration component 260. As shown in FIG. 5, the response arbitration component 260 may include a response prompt generation component 510, a response language model 520, a compliance component 530, an output routing component 540, a self-learning component 550, and a self-learning data retrieval component 570. As discussed herein above, the response arbitration component 260 processes the potential response data 243*a-n* (representing the potential responses generated by the one or more components determined to be associated with the user input) to determine whether one or more of the potential responses generated by the system 200 are responsive to the user input.

As shown in FIG. 5, the response arbitration component 260 receives the potential response data 243*a-n* (output by the component shortlister 102) at the response prompt generation component 510. The response prompt generation component 510 may further receive other context 110 (from the component shortlister 102 or the personalized context component 265) and context data 542. In some embodiments, the context data 542 may correspond to various contextual information associated with the user input (e.g., dialog history data, historical user input data, weather data, time of day, user ID, device information associated with the device that sent the user input data 227 (e.g., device ID, device states, historical device interaction data, etc.), etc.). As discussed herein below, the response arbitration component 260 may further receive additional information from the component shortlister 102, such as the potential responses of processing performed with respect to previous tasks (e.g., previous action response data) associated with the user input, and the user input data 227.

The other context 110 may represent one or more contextual signals associated with the user 205, such as information associated with a user profile of the user 205 (e.g., user ID, user behavioral information, user preferences, age, gender, historical user interaction data, devices associated with the user profile, etc.), which may be determined using, for example, a user recognition component 695. In some embodiments, an indication of the user 205 and/or user profile may be included in the user input data 227 (e.g., as included in the output of the ASR component 650.). In some embodiments, the other context 110 may include dialog history data representing one or more user inputs and corresponding system-generated responses for a current interaction between the user 205 and the system 200.

As used herein, a "dialog" may refer to multiple related user inputs and system 200 outputs (e.g., through user device(s) 210) between the system and the user that may have originated with a single user input initiating the dialog. Thus, the data associated with a dialog may be associated with a same dialog identifier, which may be used by components of the overall system 200 to associate information across the dialog. Subsequent user inputs of the same dialog may or may not start with the user speaking a wakeword. Each natural language input may be associated with a different natural language input identifier, and each natural language input identifier may be associated with a corresponding dialog identifier. Further, other non-natural language inputs (e.g., image data, gestures, button presses, etc.) may relate to a particular dialog depending on the context of the inputs. For example, a user may open a dialog with the system 200 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The response prompt generation component 510 may process the potential response data 243a-n, context data 542, and the other context 110 (and, optionally, the further information received from the component shortlister 102) to generate prompt data 515 representing a prompt for input to the response language model 520. In some embodiments, the prompt data 515 may be an instruction for the response language model 520 to determine whether one or more of the potential responses represented in the potential response data 243a-n are responsive to the user input given the other information (e.g., the other context 110, the context data 542, the potential responses associated with the previous tasks (e.g., previous action response data) associated with the user input, and the user input data 227) included in the prompt data 515. The prompt data may further be an instruction for the response language model 520 to, if the response language model 520 determines that one or more of the potential responses are responsive to the user input, cause performance of the one or more corresponding actions (e.g., the one or more potential actions included in the selected responses) and/or cause the system 200 to inform the user 205 of the one or more selected responses. For example, in some embodiments, prompt data 515 may further instruct the response language model 520 to generate a natural language summary of the one or more selected responses determined to be responsive to the user input. The prompt data 515 may instruct the response language model 520 to cause the system 200 to output the natural language summary to the user 205.

In some embodiments, the prompt data 515 may further be an instruction for the response language model 520 to, if the response language model 520 determines that none of the potential responses are responsive to the user input, generate a request for additional information from a component of the system 200 and/or the user 205. As discussed above, the additional information may be any information usable to determine and/or perform an action responsive to the user input (e.g., to resolve an ambiguity associated with the user input and/or a task(s) associated with the user input).

In some embodiments, the response prompt generation component 510 may also include in the prompt data 515 a sample processing format to be used by the response language model 520 when processing the prompt. In some embodiments, the response prompt generation component 510 may generate the prompt data 515 according to a template format. For example, the prompt data 515 may adhere to a template format including:

```
{
    "You are a conversational AI agent that communicates with users
    to satisfy their request or ask clarification questions. If applicable,
    summarize the responses that satisfy the user's request. If
    applicable, call the corresponding API's to perform the potential
    actions that satisfy the user's request. If no response is needed,
    indicate that."
    Here is the user's request:
    [user input data 227]
    Here are the potential responses:
    [potential response data 243a-n]
}
```

In some embodiments, the template format may instruct the response language model 520 as to how it should process to determine whether one or more of the potential responses are responsive to the user input. In some embodiments, the format may further include an indication, such as a label of "User:" indicating the following string of characters/tokens as the user input. In some embodiments, the format may further include a label of "Thought:" instructing the response language model 520 to generate an output representing whether one or more of the potential responses are determined to be responsive to the user input or whether additional information is needed. In some embodiments, the format may further include an indication of "Response:" instructing the response language model 520 to indicate the one or more selected responses determined to be responsive to the user input, generate a summary of the one or more selected responses, and/or generate a request for additional information.

Following such a template format, for example, and for the example user input of "What is the weather for today" and corresponding potential responses output by the com ponent shortlister 102, the response prompt generation component 510 may generate example prompt data 515*a*:

```
{
    "You are a conversational AI agent that communicates with users
    to satisfy their request or ask clarification questions. If no response
    is needed, indicate that."
    Here is the user's request:
    What is the weather for today
    Here are the potential responses and potential actions:
    Skill component A: It is currently 70 degrees, with a high of 75
    and a low of 68
    Skill component B: The weather for today is expected to be mostly
    sunny, but with a chance of rain in the late afternoon
}
```

For further example, and for the example user input of "please order some pizza for dinner" and corresponding potential responses output by the component shortlister 102, the response prompt generation component 510 may generate example prompt data 515*b*:

```
{
    "You are a conversational AI agent that communicates with users
    to satisfy their request or ask clarification questions. If no response
    is needed, indicate that."
    Here is the user's request:
    Please order some pizza for dinner
    Here are the potential responses and potential actions:
    Component A: User ordered Brooklyn style pizza from [Company
    1 name]
    API A: Use [Application 1 name] to order pizza from [Company 1
    name]
    API B: Use [Application 2 name] to order pizza from [Company 2
    name]
}
```

In some embodiments, the response prompt generation component 510 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data 515 may include "Please generate a polite, respectful, and safe response and one that does not violate protected class policy."

The response language model 520 processes the prompt data 515 to generate model output data 525 representing the one or more selected responses determined to be responsive to the user input, the natural language summary of the one or more selected responses, or the request for additional information (e.g., responsive output data 262 or query output data 263). Similar to the potential response data 243*a-n*, the model output data 525 may include various types of data including audio, text, image, video, etc.

If the response language model 520 determines that one or more of the potential responses are responsive to the user input, the response language model 520 may generate model output data 525 representing the one or more selected responses, or a natural language summary of the one or more selected responses, to be output to the user. For example, based on processing the first example prompt data above, the response language model 520 may select one of the potential responses (e.g., the potential responses from skill component A (e.g., a weather skill component)) determined to be responsive to the user input to generate model output data 525*a*: {"It is currently 70 degrees, with a high of 75 and a low of 68,"} or the like. For further example, based on processing the first example prompt data provided above, the response language model 520 may select more than one of the potential responses (e.g., the potential responses from both the skill component A and skill component B) determined to be responsive to the user input and generate a summary of the selected responses to generate model output data 525*b*: {"It is expected to be mostly sunny today, with a high of 75 and a low of 68, but with a chance of rain in the late afternoon,"} or the like.

As another example, based on processing the second example prompt data provided above, the response language model 520 may select one of the potential responses (e.g., the potential response from Component A (e.g., the personalized context component 265) representing that the user order Brooklyn style pizza from [Company 1 name]) determined to be responsive to the user input to generate model output data 525*a*: {"Ok, I will place an order for Brooklyn style pizza from [Company 1 name],"} or the like. As a further example, based on processing the second example prompt data provided above, the response language model 520 may select more than one of the potential responses (e.g., the potential responses from both component A and API A) determined to be responsive to the user input and generate a summary of the selected responses to generate model output data 525*b*: {"Ok, I will place an order for Brooklyn style pizza from [Company name] using [Application 1 name],"} or the like.

As such, the response language model 520 may select between the one or more potential responses from one or more different components (e.g., for the first example prompt data, the potential responses from the skill component A and the skill component B and, for the second example prompt data, the potential responses from Component A, API A, and API B) to determine that a subset of the potential responses are responsive to the user input. Thereafter, the response language model 520 may cause output of the selected responses (e.g., the subset of potential responses) or a natural language summary of the selected responses to the user.

In some embodiments, the response arbitration component 260 may also generate and send an instruction to the components, (e.g., API(s), components, agents, etc. as discussed herein below with respect to FIG. 4) configured to perform the potential actions included in the selected responses to cause performance of the potential actions (or another component of the system 200 configured to cause the components to perform the potential actions, such as the action plan execution component 245, which is discussed in more detail herein below). For example, in instances where the selected responses include a potential action to be performed, the response language model 520 may further cause the corresponding components to perform the potential action (e.g., cause API A to order the Brooklyn style pizza from [Company 1 name] using [Application 1 name]). In other embodiments, the system 200 may not generate and/or send the instruction until approval to perform the action(s) is received from the user 205.

If the response language model 520 determines that none of the potential responses are responsive to the user input and/or that an ambiguity exists with respect to the user input and/or one or more of the determined tasks, the response language model 520 may generate model output data 525 representing a request to be output to the user and/or the personalized context component 265. For example, based on processing the first example prompt data provided above, the response language model 520 may determine an ambiguity exists with respect to the size of the pizza to be ordered and may generate model output data 525*c*: {"What size pizza should I order?",} {"What size pizza does the user usually order?",} or the like to be output to the user and/or sent to the personalized context component 265.

As further discussed herein below, one or more of the components discussed herein (e.g., the plan generation component 235 and/or the component shortlister 102) may be capable of determining whether an ambiguity exists in the user input or the current task, and may determine that additional information is needed. In response to such a determination, the component(s) may be further configured to send a request for such additional information to the response arbitration component 260, which may process as described herein to generate a request for the additional information to be sent to the personalized context component 265 or output to the user 205 to solicit the additional information. In some embodiments, the response arbitration component 260 may send the request for additional information to the action plan execution component 245, which may cause output of the request to the user 205 to solicit the additional information.

The response language model 520 may send the model output data 525 to the compliance component 530, which is configured to determine whether model output data generated by the response language model 520 is appropriate for output to the user 205. In other words, the compliance component 530 processes the model output data 525 to determine whether the model output data 525 includes any inappropriate/sensitive information that should not be output to the user 205 (e.g., confidential information, offensive language, etc.). In some embodiments, the compliance component 530 may be configured to compare the model output data 525 to one or more words determined to be inappropriate/sensitive and should not be output to the user 205. In some embodiments, the compliance component 530 may include/implement an ML model. For example, the ML model may process the model output data 525 to determine whether the model output data 525 includes any inappropriate/sensitive information. During training, the ML model may take as input a plurality of training natural language inputs, where the ML model is tasked with classifying a natural language input as including inappropriate/sensitive information or not. The output of the ML model (e.g., 0, 1, a value between 0 and 1, or the like) resulting from processing with respect to a training natural language input may be compared to a corresponding label representing whether the natural language input includes inappropriate/sensitive information or not. Based on the comparison, one or more parameters of the ML may be configured. In some embodiments, the ML model may be a classifier.

If the output of the compliance component 530 indicates that the model output data 525 includes information that is not appropriate for output to the user 205, the compliance component 530 may cause further processing of the model output data 525 by downstream components to halt. In some embodiments, the response arbitration component 260 may cause the response language model 520 to generate new model output data 525 to be evaluated by the compliance component 530. For example, the response arbitration component 260 may cause the response prompt generation component 510 to generate new prompt data, which may include the prompt data 515, the model output data 525, and an indication that the model output data 525 is not appropriate for output to the user 205. The new prompt data may be an instruction to generate new model output data that is appropriate for output to the user 205.

If the output of the compliance component 530 indicates that the model output data 525 is appropriate for output to the user, the compliance component 530 may send the model output data 525 to the output routing component 540. The output routing component 540 processes the model output data 525 to determine one or more components that are to be caused to process in response to the model output data 525. In other words, the output routing component 540 parses the model output data 525 to determine one or more components that the model output data 525 is to be routed to (or that are to be caused to process based on the model output data 525).

For example, in an instance where the response language model 520 determines that one or more of the potential responses are responsive to the user input and generates model output data 525 including the one or more selected responses (or a natural language summary of the one or more selected responses)/the request for additional information, the output routing component 540 may parse the model output data 525 to determine the selected responses/the natural language summary and send responsive output data 262 corresponding to the selected responses/the natural language summary or query output data 263 to a component configured to generate corresponding data to be output to the user 205. For example, the output routing component 540 may send the responsive output data 262/the query output data 263 to a TTS component (e.g., the TTS component 256), which may process as described herein below to generate output audio data including synthesized speech corresponding to the responsive output data 262/the query output data 263, which the system 200 may send to the user device 210 for output to the user 205. In some embodiments, the system 200 may further include a component configured to generate visual output data (e.g., output image and/or video data) corresponding to the responsive output data 262/the query output data 263, which may be sent to the user device 210 to be output to the user. Similar to the model output data 525, the corresponding responsive output data 262/query output data 263 may include various types of data including audio, text, image, video, etc.

For further example, in embodiments where the model output data 525 includes selected responses (e.g., the responsive output data 262) that include one or more potential actions to be performed, the output routing component 540 may process as described herein above to determine the one or more selected responses/the natural language summary and send the responsive output data 262 to the one or more components associated with the selected responses. In such embodiments, the responsive output data 262 may further include an instruction for the one or more components to perform the potential actions corresponding to the selected responses. For example, in some embodiments, the components corresponding to the potential responses included in the potential response data 243a-n may, after generating the potential responses, suspend processing required to perform the potential action included in the potential responses and await an instruction from the system 200 to perform the potential action. As such, the output routing component 540 may include the instruction in the responsive output data 262 to cause the component to perform the potential action. In some embodiments, the output routing component 540 may generate an API call configured to cause the component to perform the action.

In some embodiments, where the model output data 525 includes selected responses that include one or more potential actions to be performed, the responsive output data 262 may further request authorization from the user 205 to perform the one or more potential actions responsive to the user input. After receiving the request authorization (e.g., via a subsequent user input) the response arbitration component

260 may generate and send the corresponding instruction (or API call) to perform the one or more potential actions responsive to the user input. In some embodiments, the system 200 may store data indicating prior authorization to perform the one or more potential actions responsive to the user input (or one or more actions similar to the one or more potential actions), in which case the response arbitration component 260 may use such data as authorization to perform the one or more potential actions. For example, the user 205 may have previously provided authorization for a set of actions (e.g., turning on outside lights). Thereafter, the system 200 may determine the one or more potential actions to be performed in response to the user input data 227. If the system 200 determines that the one or more actions are included in the set of actions previously authorized by the user 205, the system 200 may not ask for further authorization prior to causing the one or more potential actions to be performed.

For further example, in an instance where the response language model 520 generates model output data 525 including a request for additional information (in response to the response language model 520 determining that none of the potential responses are responsive to the user input and/or an ambiguity exists with respect to the user input and/or one or more of the tasks), which may be determined by the output routing component 540 based on, for example, the model output data 525 including a question, the output routing component 540 may parse the model output data 525 to determine whether the request for additional information is to be sent to the personalized context component 265 and/or output to the user 205. In some embodiments, the response language model 520 may include in the model output data 525 an indication of whether the request for additional information should be sent to the personalized context component 265 and/or output to the user 205. In some embodiments, unless otherwise indicated in the model output data 525, the output routing component 540 may determine to send the request for additional information to the personalized context component 265 prior to outputting the request for additional information to the user 205. In the instance where the personalized context component 265 is unable to resolve the ambiguity (or a component of the system 200 is unable to resolve the ambiguity using the personalized context data generated by the personalized context component 265), the output routing component 540 may determine the request for additional information is to be output to the user 205.

Figure 6:
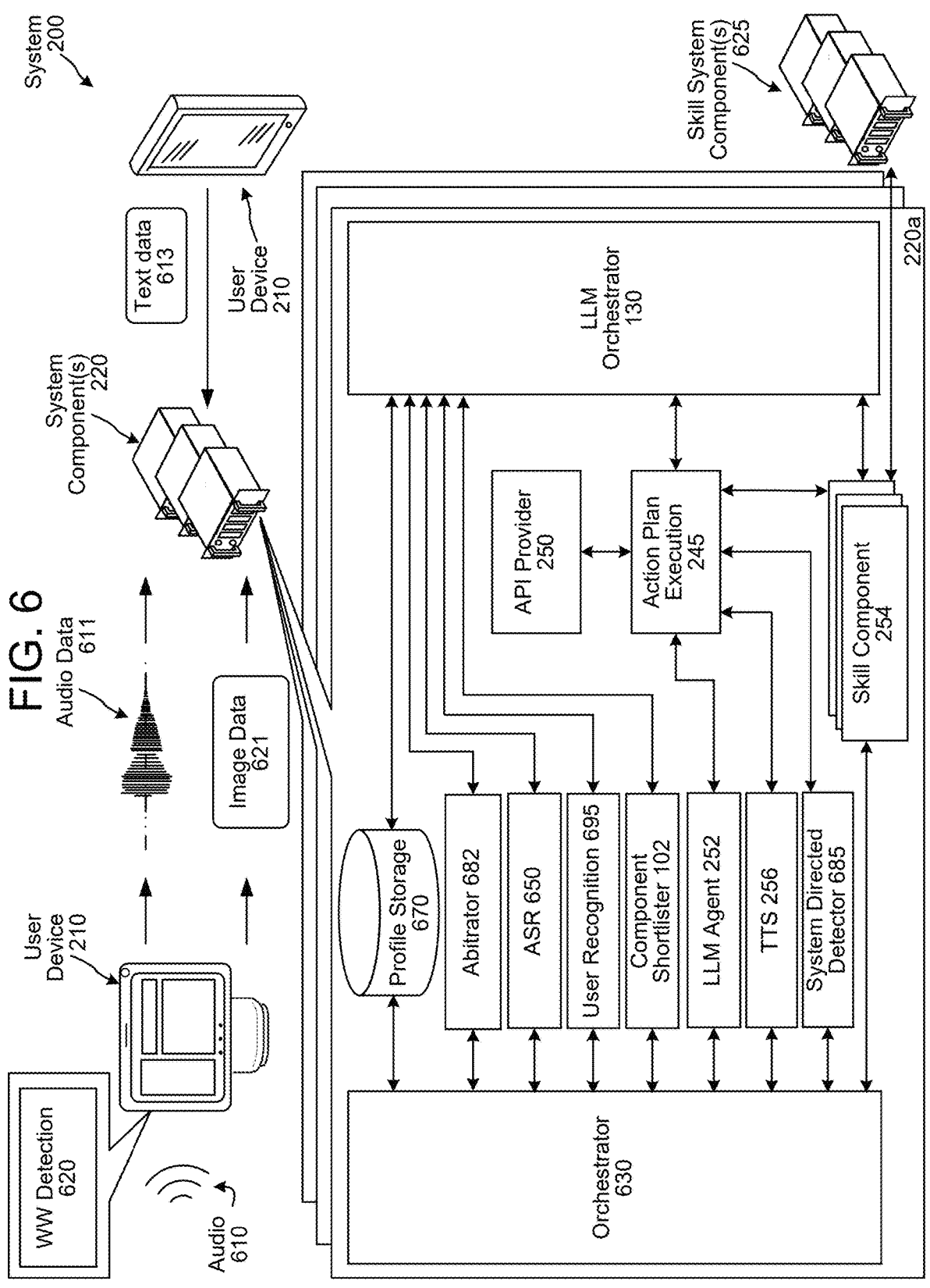
FIG. 6 is a conceptual diagram of components of the system, according to embodiments of the present disclosure.

The system 200 may operate using various components as described in FIG. 6. The various components may be located on same or different physical devices. Communication between various components may occur directly or across a network(s) 299. The user device 210 may include audio capture component(s), such as a microphone or array of microphones of a user device 210, captures audio 610 and creates corresponding audio data. Once speech is detected in audio data representing the audio 610, the user device 210 may determine if the speech is directed at the user device 210/system component(s). In at least some embodiments, such determination may be made using a wakeword detection component 620. The wakeword detection component 620 may be configured to detect various wakewords. In at least some examples, each wakeword may correspond to a name of a different digital assistant. An example wakeword/digital assistant name is "Alexa." In another example, input to the system may be in form of text data 613, for example as a result of a user typing an input into a user interface of user device 210. Other input forms may include indication that the user has pressed a physical or virtual button on user device 210, the user has made a gesture, etc. The user device 210 may also capture images using camera(s) 818 of the user device 210 and may send image data 621 representing those image(s) to the system component(s). The image data 621 may include raw image data or image data processed by the user device 210 before sending to the system component(s). The image data 621 may be used in various manners by different components of the system to perform operations such as determining whether a user is directing an utterance to the system, interpreting a user command, responding to a user command, etc.

The wakeword detection component 620 of the user device 210 may process the audio data, representing the audio 610, to determine whether speech is represented therein. The user device 210 may use various techniques to determine whether the audio data includes speech. In some examples, the user device 210 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 210 may implement a classifier configured to distinguish speech from background noise. The classifier may be implemented by techniques such as linear classifiers, support vector machines, and decision trees. In still other examples, the user device 210 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 610, is analyzed to determine if specific characteristics of the audio data match preconfigured acoustic waveforms, audio signatures, or other data corresponding to a wakeword.

Thus, the wakeword detection component 620 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 620 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 620 and/or input is detected by an input detector, the user device 210 may "wake" and begin transmitting audio data 611, representing the audio 610, to the system component(s) 220. The audio data 611 may include data corresponding to the wakeword; in other embodiments, the portion of the audio corresponding to the wakeword is removed by the user device 210 prior to sending the audio data 611 to the system component(s) 220. In the case of touch input detection or gesture based input detection, the audio data may not include a wakeword.

In some implementations, the system 200 may include more than one system component(s). The system component(s) 220 may respond to different wakewords and/or perform different categories of tasks. Each system component(s) may be associated with its own wakeword such that speaking a certain wakeword results in audio data be sent to and processed by a particular system. For example, detection of the wakeword "Alexa" by the wakeword detection component 620 may result in sending audio data to system component(s) a for processing while detection of the wakeword "Computer" by the wakeword detector may result in sending audio data to system component(s) b for processing. The system may have a separate wakeword and system for different skills/systems (e.g., "Dungeon Master" for a game play skill/system component(s) c) and/or such skills/systems may be coordinated by one or more skill component(s) 254 of one or more system component(s) 220.

The user device 210 may also include a system directed input detector 885. (The system component(s) may also include a system directed input detector 685 which may operate in a manner similar to system directed input detector 885.) The system directed input detector 885 may be configured to determine whether an input to the system (for example speech, a gesture, etc.) is directed to the system or not directed to the system (for example directed to another user, etc.). The system directed input detector 885 may work in conjunction with the wakeword detection component 620. If the system directed input detector 885 determines an input is directed to the system, the user device 210 may "wake" and begin sending captured data for further processing (for example, processing audio data using language processing, processing captured image data using image processing component 640/840 or the like). If data is being processed the user device 210 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 885 determines an input is not directed to the system (such as a speech or gesture directed to another user) the user device 210 may discard the data and take no further action for processing purposes. In this way the system 200 may prevent processing of data not directed to the system, thus protecting user privacy. As an indicator to the user, however, the system may output an audio, visual, or other indicator when the system directed input detector 885 is determining whether an input is potentially device directed. For example, the system may output an orange indicator while considering an input, and may output a green indicator if a system directed input is detected. Other such configurations are possible.

Upon receipt by the system component(s) 220, the audio data 611 may be sent to an orchestrator component 630 and/or the LLM orchestrator component 130. The orchestrator component 630 may include memory and logic that enables the orchestrator component 630 to transmit various pieces and forms of data to various components of the system, as well as perform other operations as described herein. In some embodiments, the orchestrator component 630 may optionally be included in the system component(s) 220. In embodiments where the orchestrator component 630 is not included in the system component(s) 220, the audio data 611 may be sent directly to the LLM orchestrator component 130. Further, in such embodiments, each of the components of the system component(s) 220 may be configured to interact with the LLM orchestrator component 130, the action plan execution component 245, and/or the API provider component 250.

In some embodiments, the system component(s) 220 may include an arbitrator component 682, which may be configured to determine whether the orchestrator component 630 and/or the LLM orchestrator component 130 are to process with respect to the audio data 611. In some embodiments, the LLM orchestrator component 130 may be selected to process with respect to the audio data 611 only if the user 205 associated with the audio data 611 (or the user device 210 that captured the audio 610) has previously indicated that the LLM orchestrator component 130 may be selected to process with respect to user inputs received from the user 205.

In some embodiments, the arbitrator component 682 may determine the orchestrator component 630 and/or the LLM orchestrator component 130 are to process with respect to the audio data 611 based on metadata associated with the audio data 611. For example, the arbitrator component 682 may be a classifier configured to process a natural language representation of the audio data 611 (e.g., output by the ASR component 650) and classify the corresponding user input as to be processed by the orchestrator component 630 and/or the LLM orchestrator component 130. For further example, the arbitrator component 682 may determine whether the device from which the audio data 611 is received is associated with an indicator representing the audio data 611 is to be processed by the orchestrator component 630 and/or the LLM orchestrator component 130. As an even further example, the arbitrator component 682 may determine whether the user (e.g., determined using data output from the user recognition component 695) from which the audio data 611 is received is associated with a user profile including an indicator representing the audio data 611 is to be processed by the orchestrator component 630 and/or the LLM orchestrator component 130. As another example, the arbitrator component 682 may determine whether the audio data 611 (or the output of the ASR component 650) corresponds to a request representing that the audio data 611 is to be processed by the orchestrator component 630 and/or the LLM orchestrator component 130 (e.g., a request including "let's chat" may represent that the audio data 611 is to be processed by the LLM orchestrator component 130).

In some embodiments, if the arbitrator component 682 is unsure (e.g., a confidence score corresponding to whether the orchestrator component 630 and/or the LLM orchestrator component 130 is to process is below a threshold), then the arbitrator component 682 may send the audio data 611 to both of the orchestrator component 630 and the LLM orchestrator component 130. In such embodiments, the orchestrator component 630 and/or the LLM orchestrator component 130 may include further logic for determining further confidence scores during processing representing whether the orchestrator component 630 and/or the LLM orchestrator component 130 should continue processing, as is discussed further herein below.

The arbitrator component 682 may send the audio data 611 to an ASR component 650. In some embodiments, the component selected to process the audio data 611 (e.g., the orchestrator component 630 and/or the LLM orchestrator component 130) may send the audio data 611 to the ASR component 650. The ASR component 650 may transcribe the audio data 611 into text data. The text data output by the ASR component 650 represents one or more than one (e.g., in the form of an N-best list) ASR hypotheses representing speech represented in the audio data 611. The ASR component 650 interprets the speech in the audio data 611 based on a similarity between the audio data 611 and pre-established language models. For example, the ASR component 650 may compare the audio data 611 with models for sounds (e.g., acoustic units such as phonemes, senons, phones, etc.) and sequences of sounds to identify words that match the sequence of sounds of the speech represented in the audio data 611. The ASR component 650 sends the text data generated thereby to the arbitrator component 682, the orchestrator component 630, and/or the LLM orchestrator component 130. In instances where the text data is sent to the arbitrator component 682, the arbitrator component 682 may send the text data to the component selected to process the audio data 611 (e.g., the orchestrator component 630 and/or the LLM orchestrator component 130). The text data sent from the ASR component 650 to the arbitrator component 682, the orchestrator component 630, and/or the LLM orchestrator component 130 may include a single top-scoring ASR hypothesis or may include an N-best list including multiple top-scoring ASR hypotheses. An N-best list may additionally include a respective score associated with each ASR hypothesis represented therein.

As illustrated in FIG. 6, the component shortlister component 102 may be in communication with the LLM orchestrator component 130 and the orchestrator component 630. For example, the orchestrator component 630 could call the component shortlister 102 to identify one or more skill components 254 for responding to a user input sent to the orchestrator component 630 instead of the LLM orchestrator component 130.

Figure 7:
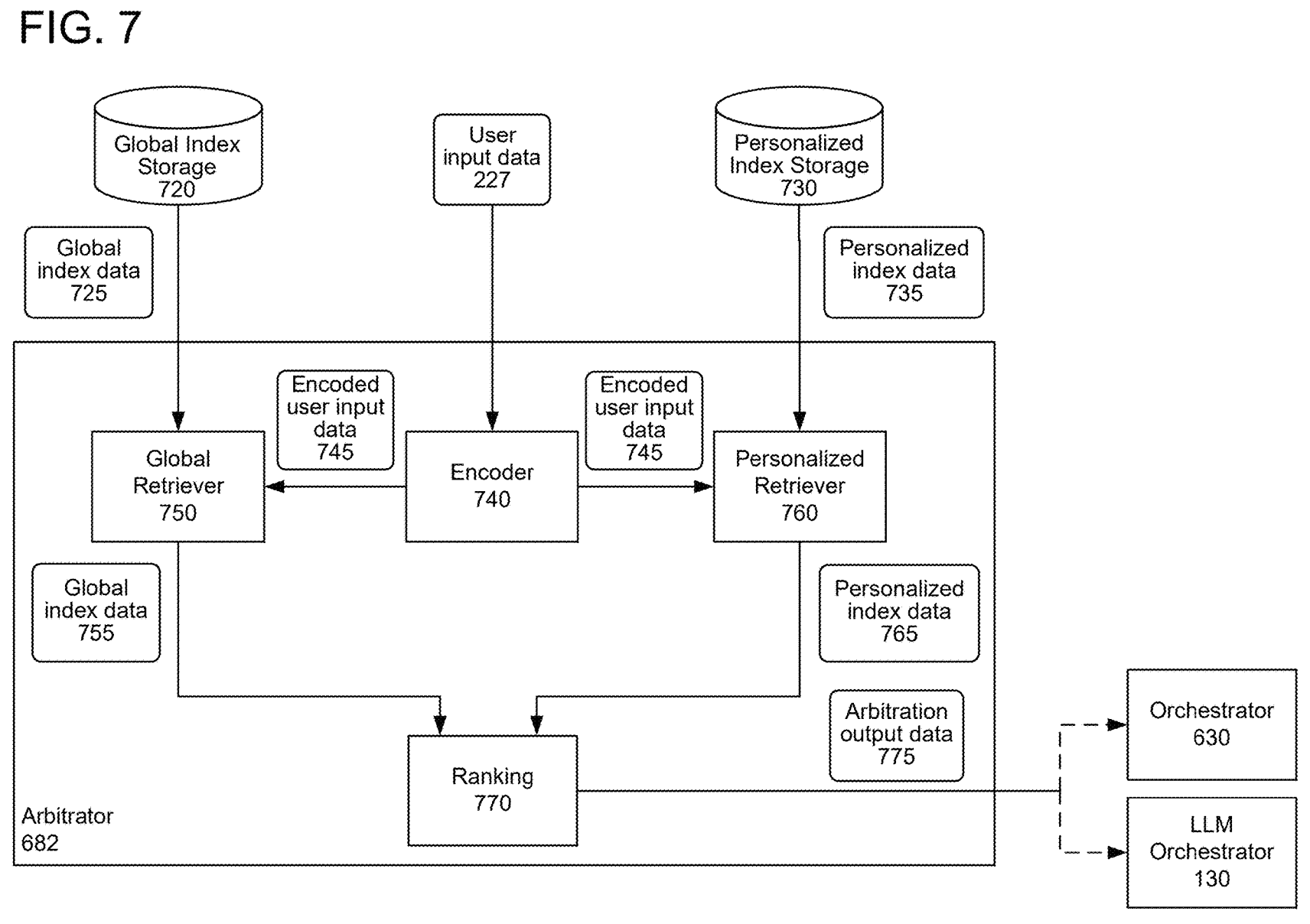

FIG. 7 illustrates example components and processing of the arbitrator component 682. As shown in FIG. 7, the arbitrator component 682 may include an encoder component 740, a global retriever component 750, a personalized retriever component 760, and a ranking component 770. The arbitrator component 682 may be in communication with a global index storage 720 and a personalized index storage 730. The arbitrator component 682 may be configured to perform retrieval-based techniques based on a semantic vectorized representation of a user input and historical user inputs received by the system 200 over a period of time (e.g., past 30 days) to determine whether the orchestrator component 630 or the LLM orchestrator component 130 or both of them should process with respect to the user input.

The user input data 227 may be received at the encoder component 740 of the arbitrator component 682. The encoder component 740 may process the user input data 227 to generate encoded user input data 745 represented an encoded representation of the user input data 227 (e.g., a vectorized representation of the user input). The encoder component may send the encoded user input data 745 to the global retriever component 750 and the personalized retriever component 760. In some embodiments, the encoder component 740 may be trained using techniques associated with Deep Structured Semantic Models (DSSM).

The global retriever component 750 is configured to determine one or more historical user inputs that are similar to the user input data 227. The global retriever component 750 queries a global index storage 720 for global index data 725 representing one or more historical user inputs that are semantically similar to the user input data 227. The global retriever component 750 may include one or more historical user inputs received from various users over a period of time (e.g., 30 days). In some embodiments, the global index data 725 may correspond to an encoded representation(s) of the historical user input(s). In such embodiments, the one or more historical user inputs that are semantically similar to the user input data 227 may be determined based on comparing the encoded user input data 745 to the encoder representation(s) of the historical user input(s) (e.g., to determine a cosine similarity). The global retriever component 750 may send the global index data 725 to the ranking component 770.

The personalized retriever component 760 is configured to determine one or more historical user inputs that are similar to the user input data 227, where the one or more historical user inputs are associated with the user 205 that provided the user input corresponding to the user input data 227. The personalized retriever component 760 queries a personalized index storage 730 for personalized index data 735 representing one or more historical user inputs that are semantically similar to the user input data 227 and were provided by the same user that provided the user input corresponding to the user input data 227. The personalized retriever component 760 may include one or more historical user inputs received from the user corresponding to the user input data 227 over a period of time (e.g., 30 days). In some embodiments, the personalized index data 735 may correspond to an encoded representation(s) of the historical user input(s). In such embodiments, the one or more historical user inputs that are semantically similar to the user input data 227 may be determined based on comparing the encoded user input data 745 to the encoder representation(s) of the historical user input(s) (e.g., to determine a cosine similarity). The personalized retriever component 760 may send the personalized index data 735 to the ranking component 770.

In some embodiments, the global index storage 720 and/or the personalized index storage 730 may further include metadata associated with the historical user inputs, which may be further included in the global index data 725 and/or the personalized index data 735. For example, the global index storage 720 and/or the personalized index storage 730 may further include a user satisfaction associated with a system-generated response to the user input, a value representing how many times the user input was received during the time period, a domain (e.g., routine, smart home, shopping, weather, etc.), etc.

In some embodiments, the global retriever component 750 and/or the personalized retriever component 760 may retrieve the global index data 725 and/or the personalized index data 735 semantically similar to the encoded user input data 745 using Maximum Inner Product Search Solution.

The ranking component 770 may process the global index data 755 and the personalized index data 765 to determine whether to send the user input data 227 to the orchestrator component 630 and/or the LLM orchestrator component 130. In some embodiments, the ranking component 770 may make such a determination based on the metadata included in the global index data 755 and/or the personalized index data 765. In some embodiments, the ranking component 770 may be a rule-based component. In other embodiments, the ranking component 770 may be an ML-based component (e.g., a decision tree, a classifier, an LLM, etc.). In embodiments where the ranking component 770 is an LLM, the ranking component 770 may be further configured to determine if there the user input is ambiguous, in which case the ranking component 770 may generate a request for additional information to resolve the ambiguity.

In some embodiments, after determining that the orchestrator component 630 and/or the LLM orchestrator component 130 should process with respect to the user input data 227, the ranking component 770 may be configured to periodically determine whether the orchestrator component 630 and/or the LLM orchestrator component 130 should continue processing with respect to the user input data 227. For example, after a particular point in the processing of the orchestrator component 630 (e.g., after performing NLU, prior to determining a skill component 254 to process with respect to the user input data 227, prior to performing an action responsive to the user input, etc.) and/or the LLM orchestrator component 130 (e.g., after selecting a task to be completed, after receiving the action response data from the one or more components, after completing a task, prior to performing an action responsive to the user input, etc.) the orchestrator component 630 and/or the LLM orchestrator component 130 may query the arbitrator component 682 has determined that the orchestrator component 630 and/or the LLM orchestrator component 130 should halt processing with respect to the user input data 227. As discussed above, the system 200 may be configured to stream portions of data associated with processing with respect to a user input to the one or more components such that the one or more components may begin performing their configured processing with respect to that data as soon as it is available to the one or more components. As such, the arbitrator component 682 may cause the orchestrator component 630 and/or the LLM orchestrator component 130 to begin processing with respect to a user input as soon as a portion of data associated with the user input data 227 is available (e.g., the ASR data, context data, output of the user recognition component 695. Thereafter, once the arbitrator component 682 has enough data to perform the processing described herein above to determine whether the orchestrator component 630 and/or the LLM orchestrator component 130 is to process with respect to the user input, the arbitrator component 682 may inform the corresponding component (e.g., the orchestrator component 630 and/or the LLM orchestrator component 130) to continue/halt processing with respect to the user input at one of the logical checkpoints in the processing of the orchestrator component 630 and/or the LLM orchestrator component 130.

In some embodiments, the orchestrator component 630 and/or the LLM orchestrator component 130 may periodically confirm that they are to continue processing with respect to the user input. For example, the arbitrator component 682 may be further configured to periodically receive data generated by the orchestrator component 630 and/or the LLM orchestrator component 130 during processing with respect to the user input and determine whether the orchestrator component 630 and/or the LLM orchestrator component 130 should continue processing. The arbitrator component 682 may receive such data at logical checkpoints in the processing of the orchestrator component 630 (e.g., after completion of ASR processing, after completion of natural language understanding processing, after selection of a skill component to process with respect to the user input and prior to initiation of processing by the skill component, or prior to the processing of any component discussed herein with respect to the orchestrator component 630) and/or the LLM orchestrator component 130 (e.g., prior to processing of the component shortlister 102, prior to beginning processing with respect to a subsequent task, or prior to the processing of any other component discussed herein above with respect to the LLM orchestrator component 130). The arbitrator component 682 may be configured to process as described herein above to compare the received data to data associated with processing of a previous user input. This may allow the arbitrator component 682 to make a more informed determination (e.g., based on the additional data determined during processing of the orchestrator component 630 and/or the LLM orchestrator component 130) as to which component(s) should process the user input. In some embodiments, the data may be received at another component of the system 200 configured to process as described herein.

In some embodiments, after sending the data to the arbitrator component 682, the orchestrator component 630 and/or the LLM orchestrator component 130 may temporarily suspend processing with respect to the user input until they receive data from the arbitrator component 682 confirming that they are to continue processing with respect to the user input. As discussed above, in some embodiments, the LLM orchestrator component 130 may send the data to the arbitrator component 682 prior to the processing of the component shortlister 102. In some embodiments, the LLM orchestrator component 130 may further include a component configured to process the task processing data output by the plan generation component 235 (e.g., the task processing data 237) to determine whether completion of the current task will result in a real-world action (e.g., a change in the state of a device, such as turning on a light, changing a channel on a television, changing a temperature value on a thermostat, locking a door, etc.). If the component determines that completion of the current task will result in a real-world action, then the LLM orchestrator component 130 may temporarily suspend its processing prior to the processing of the component shortlister 102. If the component determines that completion of the current task will not result in a real-world action, then the LLM orchestrator component 130 may begin processing of the component shortlister 102, rather than temporarily suspending processing. In some embodiments, the orchestrator component 630 may include a similarly configured component.

A skill system component(s) 625 may communicate with a skill component(s) 254 within the system component(s) 220 directly with the orchestrator component 630 and/or the action plan execution component 245, or with other components. A skill system component(s) 625 may be configured to perform one or more actions. An ability to perform such action(s) may sometimes be referred to as a "skill." That is, a skill may enable a skill system component(s) 625 to execute specific functionality in order to provide data or perform some other action requested by a user. For example, a weather service skill may enable a skill system component(s) 625 to provide weather information to the system component(s) 220, a car service skill may enable a skill system component(s) 625 to book a trip with respect to a taxi or ride sharing service, an order pizza skill may enable a skill system component(s) 625 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 220 may be configured with a skill component 254 dedicated to interacting with the skill system component(s) 625. Unless expressly stated otherwise, reference to a skill, skill device, or skill component may include a skill component 254 operated by the system component(s) 220 and/or skill operated by the skill system component(s) 625. Moreover, the functionality described herein as a skill or skill may be referred to using many different terms, such as an action, bot, app, or the like. The skill component 254 and or skill system component(s) 625 may return output data to the orchestrator component 630.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system component(s) includes a TTS component 256. The TTS component 256 may generate audio data (e.g., synthesized speech) from text data using one or more different methods. Text data input to the TTS component 256 may come from a skill component 254, the orchestrator component 630, or another component of the system. In one method of synthesis called unit selection, the TTS component 256 matches text data against a database of recorded speech. The TTS component 256 selects matching units of recorded speech and concatenates the units together to form audio data. In another method of synthesis called parametric synthesis, the TTS component 256 varies parameters such as frequency, volume, and noise to create audio data including an artificial speech waveform. Parametric synthesis uses a computerized voice generator, sometimes called a vocoder.

The user device 210 may include still image and/or video capture components such as a camera or cameras to capture one or more images. The user device 210 may include circuitry for digitizing the images and/or video for transmission to the system component(s) 220 as image data. The user device 210 may further include circuitry for voice command-based control of the camera, allowing a user 205 to request capture of image or video data. The user device 210 may process the commands locally or send audio data 611 representing the commands to the system component(s) 220 for processing, after which the system component(s) 220 may return output data that can cause the user device 210 to engage its camera.

The system component(s) 220 may include a user recognition component 695 that recognizes one or more users using a variety of data. However, the disclosure is not limited thereto, and the user device 210 may include a user recognition component 895 instead of and/or in addition to user recognition component 695 of the system component(s) 220 without departing from the disclosure. User recognition component 895 operates similarly to user recognition component 695.

The user recognition component 695 may take as input the audio data 611 and/or text data output by the ASR component 650. The user recognition component 695 may perform user recognition by comparing audio characteristics in the audio data 611 to stored audio characteristics of users. The user recognition component 695 may also perform user recognition by comparing biometric data (e.g., fingerprint data, iris data, etc.), received by the system in correlation with the present user input, to stored biometric data of users assuming user permission and previous authorization. The user recognition component 695 may further perform user recognition by comparing image data (e.g., including a representation of at least a feature of a user), received by the system in correlation with the present user input, with stored image data including representations of features of different users. The user recognition component 695 may perform additional user recognition processes, including those known in the art.

The user recognition component 695 determines scores indicating whether user input originated from a particular user. For example, a first score may indicate a likelihood that the user input originated from a first user, a second score may indicate a likelihood that the user input originated from a second user, etc. The user recognition component 695 also determines an overall confidence regarding the accuracy of user recognition operations.

Output of the user recognition component 695 may include a single user identifier corresponding to the most likely user that originated the user input. Alternatively, output of the user recognition component 695 may include an N-best list of user identifiers with respective scores indicating likelihoods of respective users originating the user input. The output of the user recognition component 695 may be used to inform processing of the arbitrator component 682, the orchestrator component 630, and/or the LLM orchestrator component 130 as well as processing performed by other components of the system.

The system component(s) 220/user device 210 may include a presence detection component that determines the presence and/or location of one or more users using a variety of data.

The system 200 (either on user device 210, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 670 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 210, the user profile (associated with the presented login information) may be updated to include information about the user device 210, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 670 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 670 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Figure 8:
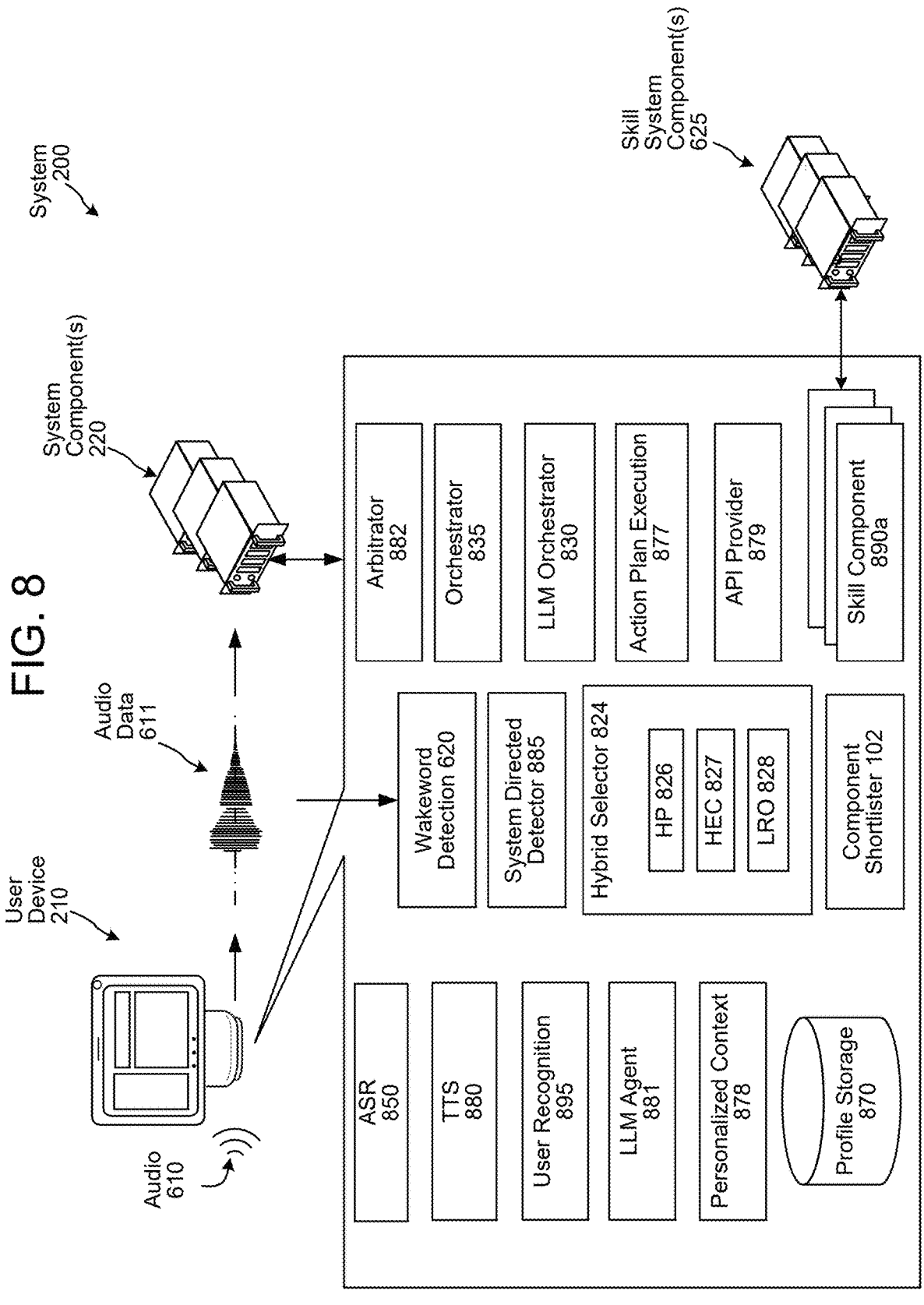
FIG. 8 is a conceptual diagram illustrating components that may be included in a device, according to embodiments of the present disclosure.

Although the components of FIG. 6 may be illustrated as part of system component(s) 220, user device 210, or otherwise, the components may be arranged in other device(s) (such as in user device 210 if illustrated in system component(s) 220 or vice-versa, or in other device(s) altogether) without departing from the disclosure. FIG. 8 illustrates such a configured user device 210.

In at least some embodiments, the system component(s) may receive the audio data 611 from the user device 210, to recognize speech corresponding to a spoken input in the received audio data 611, and to perform functions in response to the recognized speech. In at least some embodiments, these functions involve sending directives (e.g., commands), from the system component(s) to the user device 210 (and/or other devices 210) to cause the user device 210 to perform an action, such as output an audible response to the spoken input via a loudspeaker(s), and/or control secondary devices in the environment by sending a control command to the secondary devices.

Thus, when the user device 210 is able to communicate with the system component(s) over the network(s) 299, some or all of the functions capable of being performed by the system component(s) may be performed by sending one or more directives over the network(s) 299 to the user device 210, which, in turn, may process the directive(s) and perform one or more corresponding actions. For example, the system component(s), using a remote directive that is included in response data (e.g., a remote response), may instruct the user device 210 to output an audible response (e.g., using TTS processing performed by an on-device TTS component 880) to a user's question via a loudspeaker(s) of (or otherwise associated with) the user device 210, to output content (e.g., music) via the loudspeaker(s) of (or otherwise associated with) the user device 210, to display content on a display of (or otherwise associated with) the user device 210, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 205 as part of a shopping function, establishing a communication session (e.g., a video call) between the user 205 and another user, and so on.

As noted with respect to FIG. 6, the user device 210 may include a wakeword detection component 620 configured to compare the audio data 611 to stored models used to detect a wakeword (e.g., "Alexa") that indicates to the user device 210 that the audio data 611 is to be processed by the user device 210 (e.g., by the orchestrator component 835 and/or the LLM orchestrator 830, which are configured similar to the orchestrator component 630 and the LLM orchestrator component 130, respectively). In at least some embodiments, a hybrid selector 824, of the user device 210, may send the audio data 611 to the wakeword detection component 620. If the wakeword detection component 620 detects a wakeword in the audio data 611, the wakeword detection component 620 may send an indication of such detection to the hybrid selector 824. In response to receiving the indication, the hybrid selector 824 may send the audio data 611 to the system component(s) and/or the ASR component 850. The wakeword detection component 620 may also send an indication, to the hybrid selector 824, representing a wakeword was not detected. In response to receiving such an indication, the hybrid selector 824 may refrain from sending the audio data 611 to the system component(s), and may prevent the ASR component 850 from further processing the audio data 611. In this situation, the audio data 611 can be discarded.

The user device 210 may conduct its own speech processing using on-device language processing components, such as an ASR component 850, similar to the manner discussed herein with respect to the ASR component 650 of the system component(s). ASR component 850 may operate similarly to ASR component 650. The user device 210 may also internally include, or otherwise have access to, other components such as the component shortlister 102, one or more skill components 890 capable of executing commands based on the output of the orchestrator component 835, the LLM orchestrator 830, or other results determined by the user device 210/system component(s) (which may operate similarly to skill components 154), an arbitrator component 882 (configured to process in a similar manner to that discussed herein above with respect to the arbitrator component 682), an action plan execution component 877 (configured to process in a similar manner to that discussed herein with respect to the action plan execution component 245), a personalized context component 878 (configured to process in a similar manner to that discussed herein with respect to the personalized context component 265) an API provider component 879 (configured to process in a similar manner to that discussed herein with respect to the API provider component 250), and LLM agent component 881 (configured to process in a similar manner to that discussed herein with respect to the LLM agent component 252), a user recognition component 895 (configured to process in a similar manner to that discussed herein with respect to the user recognition component 695 of the system component(s)), profile storage 870 (configured to store similar profile data to that discussed herein with respect to the profile storage 670 of the system component(s)), or other components. In at least some embodiments, the profile storage 870 may only store profile data for a user or group of users specifically associated with the user device 210. Similar to as described above with respect to skill component 254, a skill component 890 may communicate with a skill system component(s) 625. The user device 210 may also have its own TTS component 880, which may operate similarly to TTS component 256.

In at least some embodiments, the on-device language processing components may not have the same capabilities as the language processing components of the system component(s). For example, the on-device language processing components may be configured to handle only a subset of the natural language user inputs that may be handled by the system component(s). For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s). If the user device 210 attempts to process a natural language user input for which the on-device language processing components are not necessarily best suited, the language processing results determined by the user device 210 may indicate a low confidence or other metric indicating that the processing by the user device 210 may not be as accurate as the processing done by the system component(s).

The hybrid selector 824, of the user device 210, may include a hybrid proxy (HP) 826 configured to proxy traffic to/from the system component(s). For example, the HP 826 may be configured to send messages to/from a hybrid execution controller (HEC) 827 of the hybrid selector 824. For example, command/directive data received from the system component(s) can be sent to the HEC 827 using the HP 826. The HP 826 may also be configured to allow the audio data 611 to pass to the system component(s) while also receiving (e.g., intercepting) this audio data 611 and sending the audio data 611 to the HEC 827.

In at least some embodiments, the hybrid selector 824 may further include a local request orchestrator (LRO) 828 configured to notify the ASR component 850 about the availability of new audio data 611 that represents user speech, and to otherwise initiate the operations of local language processing when new audio data 611 becomes available. In general, the hybrid selector 824 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the user device 210 receives directive data from the system component(s) and chooses to use that remotely-determined directive data.

Thus, when the audio data 611 is received, the HP 826 may allow the audio data 611 to pass through to the system component(s) and the HP 826 may also input the audio data 611 to the on-device ASR component 850 by routing the audio data 611 through the HEC 827 of the hybrid selector 824, whereby the LRO 828 notifies the ASR component 850 of the audio data 611. At this point, the hybrid selector 824 may wait for response data from either or both of the system component(s) or the local language processing components. However, the disclosure is not limited thereto, and in some examples the hybrid selector 824 may send the audio data 611 only to the local ASR component 850 without departing from the disclosure. For example, the user device 210 may process the audio data 611 locally without sending the audio data 611 to the system component(s).

The local ASR component 850 is configured to receive the audio data 611 from the hybrid selector 824, and to recognize speech in the audio data 611. The user device 210 and/or the system component(s) may associate a unique identifier with each natural language user input. The user device 210 may include the unique identifier when sending the audio data 611 to the system component(s), and the response data from the system component(s) may include the unique identifier to identify which natural language user input the response data corresponds.

In at least some embodiments, the user device 210 may include, or be configured to use, one or more skill components 890 that may work similarly to the skill component(s) 254 implemented by the system component(s). The skill component(s) 890 may correspond to one or more domains that are used in order to determine how to act on a spoken input in a particular way, such as by outputting a directive that corresponds to the determined intent, and which can be processed to implement the desired operation. The skill component(s) 890 installed on the user device 210 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the user device 210 may be in communication with one or more skill system component(s) 625. For example, a skill system component(s) 625 may be located in a remote environment (e.g., separate location) such that the user device 210 may only communicate with the skill system component(s) 625 via the network(s) 299. However, the disclosure is not limited thereto. For example, in at least some embodiments, a skill system component(s) 625 may be configured in a local environment (e.g., home server and/or the like) such that the user device 210 may communicate with the skill system component(s) 625 via a private network, such as a local area network (LAN).

As used herein, a "skill" may refer to a skill component 890, a skill system component(s) 625, or a combination of a skill component 890 and a corresponding skill system component(s) 625.

Similar to the manner discussed with regard to FIG. 6, the local user device 210 may be configured to recognize multiple different wakewords and/or perform different categories of tasks depending on the wakeword. Such different wakewords may invoke different processing components of local user device 210 (not illustrated in FIG. 8). For example, detection of the wakeword "Alexa" by the wakeword detection component 620 may result in sending audio data to certain language processing components/skill components 890 for processing while detection of the wakeword "Computer" by the wakeword detector may result in sending audio data different language processing components/skill components 890 for processing.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, Ada-Boost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

FIG. 9 is a block diagram conceptually illustrating a user device 210 that may be used with the system. FIG. 10 is a block diagram conceptually illustrating example components of a remote device, such as the natural language command processing system component(s) 220, which may assist with ASR processing, NLU processing, etc., and a skill system component(s) 625. A system (220/625) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the user device 210 may operate locally to a user (e.g., within a same environment so the device may receive inputs and playback outputs for the user) the server/system component(s) 220 may be located remotely from the user device 210 as its operations may not require proximity to the user. The system component(s) 220 may be located in an entirely different location from the user device 210 (for example, as part of a cloud computing system or the like) or may be located in a same environment as the user device 210 but physically separated therefrom (for example a home server or similar device that resides in a user's home or business but perhaps in a closet, basement, attic, or the like). The system component(s) 220 may also be a version of a user device 210 that includes different (e.g., more) processing capabilities than other user devices in a home/office. One benefit to the system component(s) 220 being in a user's home/business is that data used to process a command/return a response may be kept within the user's home, thus reducing potential privacy concerns.

Multiple systems (220/625) may be included in the system 200 of the present disclosure, such as a system component(s) 220 for performing ASR processing, a system component(s) 220 for performing NLU processing, one or more skill system components 625, etc. In operation, each of these systems may include computer-readable and computer-executable instructions that reside on the respective device (220/625), as will be discussed further below.

Each of these devices (210/220/625) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (210/220/625) may also include a data storage component (908/1008) for storing data and controller/processor-executable instructions. Each data storage component (908/1008) may individually include one or more non-volatile storage types such as magnetic storage, optical storage, solid-state storage, etc. Each device (210/220/625) may also be connected to removable or external non-volatile memory and/or storage (such as a removable memory card, memory key drive, networked storage, etc.) through respective input/output device interfaces (902/1002).

Computer instructions for operating each device (210/220/625) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (210/220/625) includes input/output device interfaces (902/1002). A variety of components may be connected through the input/output device interfaces (902/1002), as will be discussed further below. Additionally, each device (210/220/625) may include an address/data bus (924/1024) for conveying data among components of the respective device. Each component within a device (210/220/625) may also be directly connected to other components in addition to (or instead of) being connected to other components across the bus (924/1024).

Referring to FIG. 9, the user device 210 may include input/output device interfaces 902 that connect to a variety of components such as an audio output component such as a speaker 912, a wired headset or a wireless headset (not illustrated), or other component capable of outputting audio. The user device 210 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user device 210 may additionally include a display 916 for displaying content. The user device 210 may further include a camera 918.

Via antenna(s) 922, the input/output device interfaces 902 may connect to the network(s) 299 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 299, the system may be distributed across a networked environment. The I/O device interface (902/1002) may also include communication components that allow data to be exchanged between devices such as different physical servers in a collection of servers or other components.

The components of the user device 210, the natural language command processing system component(s) 220, or a skill system component(s) 625 may include their own dedicated processors, memory, and/or storage. Alternatively, one or more of the components of the user device 210, the natural language command processing system component(s) 220, or a skill system component(s) 625 may utilize the I/O interfaces (902/1002), processor(s) (904/1004), memory (906/1006), and/or storage (908/1008) of the user device 210, natural language command processing system component(s) 220, or the skill system component(s) 625, respectively. Thus, the ASR component 650 may have its own I/O interface(s), processor(s), memory, and/or storage; the NLU component 660 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the user device 210, the natural language command processing system component(s) 220, and a skill system component(s) 625, as described herein, are illustrative, and may be located as a stand-alone device or may be included, in whole or in part, as a component of a larger device or system. As can be appreciated, a number of components may exist either on a system component(s) 220 and/or on device 210. For example, language processing 692/892 (which may include ASR 650/850), language output 693/893 (which may include NLG 679/879 and TTS 680/880), etc., for example as illustrated in FIGS. 6 and 8. Unless expressly noted otherwise, the system version of such components may operate similarly to the device version of such components and thus the description of one version (e.g., the system version or the local version) applies to the description of the other version (e.g., the local version or system version) and vice-versa.

Figure 11:
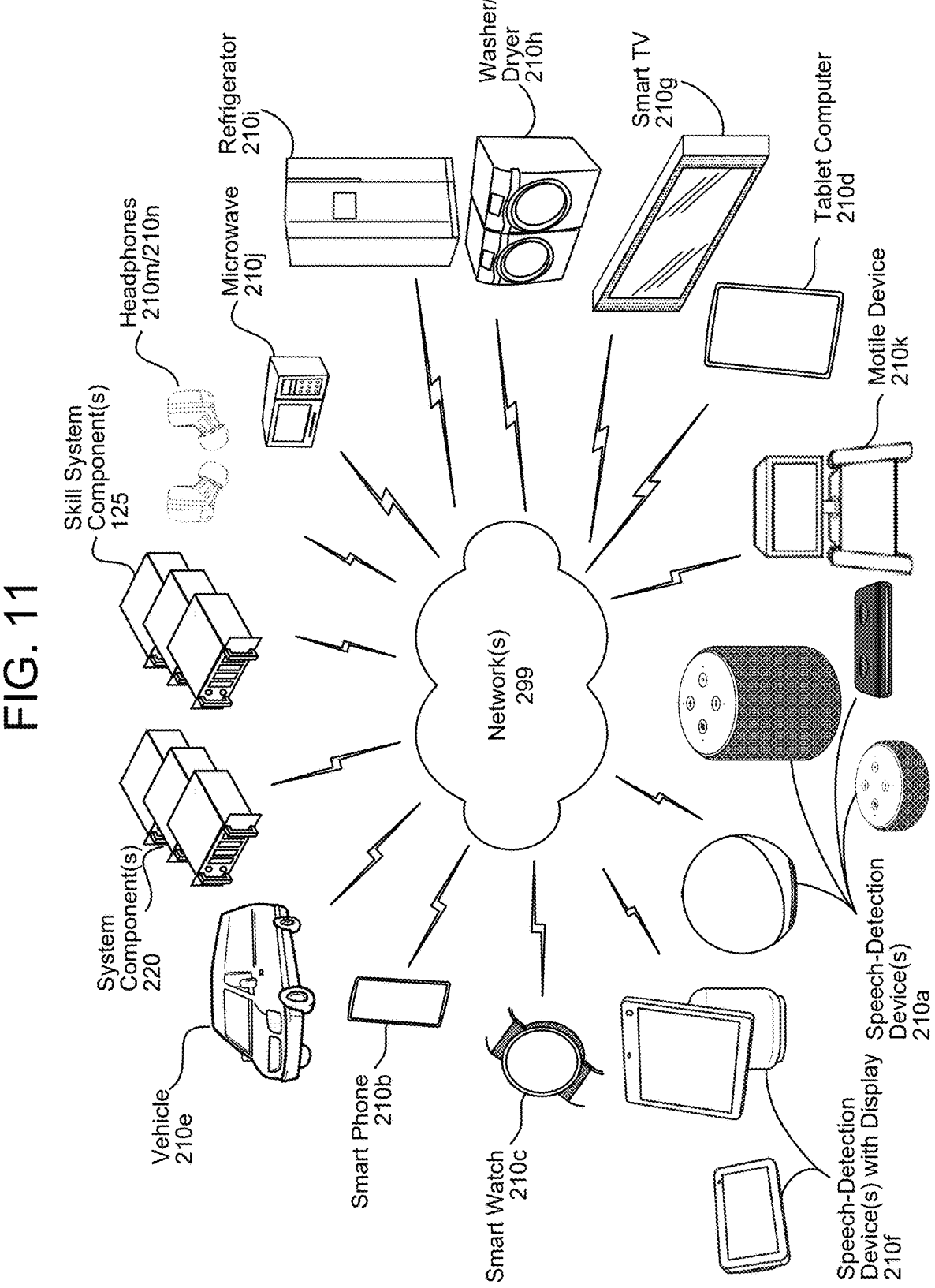
FIG. 11 illustrates an example of a computer network, according to embodiments of the present disclosure.

As illustrated in FIG. 11, multiple devices (210a-210n, 220, 625) may contain components of the system and the devices may be connected over a network(s) 299. The network(s) 299 may include a local or private network or may include a wide network such as the Internet. Devices may be connected to the network(s) 299 through either wired or wireless connections. For example, a speech-detection device 210a, a smart phone 210b, a smart watch 210c, a tablet computer 210d, a vehicle 210e, a speech-detection device with display 210f, a display/smart television 210g, a washer/dryer 210h, a refrigerator 210i, a microwave 210j, autonomously motile device 210k (e.g., a robot), etc., may be connected to the network(s) 299 through a wireless service provider, over a Wi-Fi or cellular network connection, or the like. Other devices are included as network-connected support devices, such as the natural language command processing system component(s) 220, the skill system component(s) 625, and/or others. The support devices may connect to the network(s) 299 through a wired connection or wireless connection. Networked devices may capture audio using one-or-more built-in or connected microphones or other audio capture devices, with processing performed by ASR components, NLU components, or other components of the same device or another device connected via the network(s) 299, such as the ASR component 650, the NLU component 660, etc. of the natural language command processing system component(s) 220.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving audio data corresponding to a first spoken user input associated with user profile data;
   processing the audio data to determine a transcript of the first spoken user input;
   generating a first prompt for a first search query to identify one or more application program interfaces (APIs) based on the transcript and the user profile data;
   processing, using a first large language model (LLM), the first prompt to generate the first search query to identify one or more APIs;
   using a first machine learning (ML) trained model, processing the first search query generated by the LLM and a plurality of API descriptions to determine a set of APIs capable of performing a task with respect to the first spoken user input;
   generating a second prompt to identify at least one API, from the set of APIs, to perform the task, the second prompt including the user profile data;
   processing, using a second LLM, the second prompt to select, from the set of APIs, a first API to perform the task;
   based on the second LLM selecting the first API, performing, using the first API, the task to determine output data responsive to the first spoken user input; and
   causing presentation of the output data.

2. The computer-implemented method of claim 1, further comprising:
   receiving metric data associated with the first API, wherein the metric data indicates at least one of:
      a number of times the first API was called and provided a response;
      a number of times the first API was called and resulted in positive user feedback; and
      a number of times the first API was called with respect to user inputs associated with the user profile data; and
   based at least in part on the metric data, including the first API in the set of APIs.

3. The computer-implemented method of claim 1, further comprising:
   determining a first location indicated in the user profile data;
   determining a second location associated with a second API;
   determining the second location is different from the first location; and
   excluding, from the plurality of API descriptions, an API description of the second API based on the second location being different from the first location.

4. The computer-implemented method of claim 1, further comprising:
   using a second ML trained model, processing the transcript and a stored second spoken user input for invoking a second API to determine the second API is configured to perform the task; and
   generating the second prompt to further indicate the second API.

5. A computer-implemented method comprising:
   receiving first input data representing a first user input;
   processing, using a first large language model (LLM), the first input data to generate a first query to search component descriptions to identify one or more components corresponding to the first user input;
   using the first query generated by the first LLM, determining a set of components corresponding to the first user input;
   generating a first LLM prompt indicating the set of components;
   processing, using a second LLM, the first LLM prompt to select, from the set of components, a first component to perform a task corresponding to the first user input;
   generating, using at least the first component, output data responsive to the first user input; and
   presenting the output data.

6. The computer-implemented method of claim 5, further comprising:
   receiving metric data associated with the first component, wherein the metric data indicates at least one of:
      a number of times the first component was called and provided a response;
      a number of times the first component was called and resulted in positive user feedback; and
      a number of times the first component was called with respect to user inputs associated with user profile data associated with the first user input; and
   based at least in part on the metric data, generating the first LLM prompt to indicate the first component.

7. The computer-implemented method of claim 5, further comprising:
   determining a first location indicated in user profile data associated with the first user input;
   determining a second location associated with a second component;
   determining the second location is different from the first location; and
   based on the second location being different from the first location, excluding the second component from the set of components.

8. The computer-implemented method of claim 5, further comprising:
   based on a stored second user input for invoking a second component, determining the second component is configured to perform the task; and
   generating the first LLM prompt to further indicate the second component.

9. The computer-implemented method of claim 8, further comprising:

receiving audio data corresponding to the first user input;

performing automatic speech recognition (ASR) processing on the audio data to generate ASR results;

determining the second component is configured to perform the task based on the stored second user input corresponding to the ASR results; and determining the set of components using the first query at least partially in parallel or after determining the second component is configured to perform the task.

10. The computer-implemented method of claim 5, further comprising:

generating a second LLM prompt for the first query; and processing, using the first LLM, the second LLM prompt to determine the first query.

11. The computer-implemented method of claim 5, wherein the first user input is received from a first device, and wherein the computer-implemented method further comprises:

determining a first device type of the first device;

determining a second device type associated with a second component;

determining the second device type is different from the first device type; and excluding the second component from the first LLM prompt based on the second device type being different from the first device type.

12. The computer-implemented method of claim 5, further comprising:

storing first data indicating the first component was selected to perform the task with respect to the first user input;

receiving second data representing a second user input;

determining the second user input corresponds to the first user input; and based on the first data and the second user input corresponding to the first user input, determining the first component is configured to perform a task with respect to the second user input.

13. A computing system comprising:

at least one processor; and at least one memory comprising instructions that, when executed by the at least one processor, cause the computing system to:

receive first input data representing a first user input;

process, using a first large language model (LLM), the first input data to generate a first query to search component descriptions to identify one or more components corresponding to the first user input;

using the first query generated by the first LLM, determine a set of components corresponding to the first user input;

generate a first LLM prompt indicating the set of components;

process, using a second LLM, the first LLM prompt to select, from the set of components, a first component to perform a task corresponding to the first user input;

generate, using at least the first component, output data responsive to the first user input; and present the output data.

14. The computing system of claim 13, wherein the at least one memory further comprises instruction that, when executed by the at least one processor, further cause the computing system to:

receive metric data associated with the first component, wherein the metric data indicates at least one of:

a number of times the first component was called and provided a response;

a number of times the first component was called and resulted in positive user feedback; and a number of times the first component was called with respect to user inputs associated with user profile data associated with the first user input; and based at least in part on the metric data, generate the first LLM prompt to indicate the first component.

15. The computing system of claim 13, wherein the at least one memory further comprises instruction that, when executed by the at least one processor, further cause the computing system to:

determine a first location indicated in user profile data associated with the first user input;

determine a second location associated with a second component;

determine the second location is different from the first location; and based on the second location being different from the first location, exclude the second component from the set of components.

16. The computing system of claim 13, wherein the at least one memory further comprises instruction that, when executed by the at least one processor, further cause the computing system to:

based on a stored second user input for invoking a second component, determine the second component is configured to perform the task; and generate the first LLM prompt to further indicate the second component.

17. The computing system of claim 16, wherein the at least one memory further comprises instruction that, when executed by the at least one processor, further cause the computing system to:

receive audio data corresponding to the first user input;

perform automatic speech recognition (ASR) processing on the audio data to generate ASR results;

determine the second component is configured to perform the task based on the stored second user input corresponding to the ASR results; and determine the set of components using the first query at least partially in parallel or after determining the second component is configured to perform the task.

18. The computing system of claim 13, wherein the at least one memory further comprises instruction that, when executed by the at least one processor, further cause the computing system to:

generate a second LLM prompt for the first query; and process, using the first LLM, the second LLM prompt to determine the first query.

19. The computing system of claim 13, wherein the first user input is received from a first device, and wherein the at least one memory further comprises instruction that, when executed by the at least one processor, further cause the computing system to:

determine a first device type of the first device;

determine a second device type associated with a second component;

determine the second device type is different from the first device type; and exclude the second component from the first LLM prompt based on the second device type being different from the first device type.

20. The computing system of claim 13, wherein the at least one memory further comprises instruction that, when executed by the at least one processor, further cause the computing system to:

store first data indicating the first component was selected to perform the task with respect to the first user input;

receive second data representing a second user input;

determine the second user input corresponds to the first user input; and based on the first data and the second user input corresponding to the first user input, determine the first component is configured to perform a task with respect to the second user input.

\* \* \* \* \*